United States Patent
Kommalapati et al.

(10) Patent No.: US 12,034,812 B2
(45) Date of Patent: Jul. 9, 2024

(54) GLOBAL INTERNET OF THINGS (IOT) CONNECTIVITY FABRIC

(71) Applicant: Microsoft Technology Licensing, LLC, Redmond, WA (US)

(72) Inventors: Hanumantha Rao Kommalapati, Kirkland, WA (US); Arun Ramadasan Mannengal, Sammamish, WA (US); Cameron William Skinner, Woodinville, WA (US)

(73) Assignee: Ray Quinney & Nebeker, Salt Lake City, WA (US)

( * ) Notice: Subject to any disclaimer, the term of this patent is extended or adjusted under 35 U.S.C. 154(b) by 0 days.

(21) Appl. No.: 17/061,440

(22) Filed: Oct. 1, 2020

(65) Prior Publication Data

US 2022/0108806 A1    Apr. 7, 2022

(51) Int. Cl.
*H04L 67/141* (2022.01)
*G16Y 30/00* (2020.01)
*G16Y 40/35* (2020.01)
*H04L 61/4511* (2022.01)
*H04L 67/55* (2022.01)
(Continued)

(52) U.S. Cl.
CPC ............ *H04L 67/141* (2013.01); *G16Y 30/00* (2020.01); *G16Y 40/35* (2020.01); *H04L 67/55* (2022.05); *H04L 67/561* (2022.05); *H04L 67/567* (2022.05); *H04L 61/4511* (2022.05)

(58) Field of Classification Search
CPC ... H04L 67/141; H04L 67/26; H04L 67/2804; H04L 67/2838; H04L 61/1511; G16Y 30/00; G16Y 40/35

USPC ......................................................... 709/203
See application file for complete search history.

(56) References Cited

U.S. PATENT DOCUMENTS

| | | |
|---|---|---|
| 6,404,858 B1 | 6/2002 | Farris et al. |
| 9,699,034 B2 | 7/2017 | Lee |
| 10,270,663 B2 | 4/2019 | Mellquist et al. |

(Continued)

FOREIGN PATENT DOCUMENTS

EP    3282718 A1 *   2/2018   .............. H04W 4/38

OTHER PUBLICATIONS

"Cisco Software-Defined Access Design Guide", Retrieved from: https://www.cisco.com/c/en/us/td/docs/solutions/CVD/Campus/cisco-sda-design-guide.html, Jul. 13, 2020, 122 Pages.

(Continued)

*Primary Examiner* — Suraj M Joshi
*Assistant Examiner* — Ayele F Woldemariam
(74) *Attorney, Agent, or Firm* — RAY QUINNEY & NEBEKER; Tiffany Healy

(57) ABSTRACT

The systems and methods relate to an internet of things (IoT) system that includes a global IoT connectivity fabric to facilitate communications between a plurality of applications that provide services to one or more IoT devices. The global IoT connectivity fabric may include a plurality of global IoT connectivity fabric nodes that establish communication channels between the applications and the IoT devices. The global IoT connectivity fabric may implement a channel architecture where the IoT devices declare one or more channels for sending and/or receiving communications. The applications may subscribe to the one or more channels declared by the IoT devices and may communicate with the IoT devices through the one or more channels.

17 Claims, 11 Drawing Sheets

(51) Int. Cl.
*H04L 67/561* (2022.01)
*H04L 67/567* (2022.01)

(56) References Cited

U.S. PATENT DOCUMENTS

| | | | |
|---|---|---|---|
| 10,645,181 B2* | 5/2020 | Hoffner | H04L 67/55 |
| 10,686,665 B2 | 6/2020 | Rao et al. | |
| 2017/0041231 A1* | 2/2017 | Seed | H04W 4/70 |
| 2018/0191676 A1* | 7/2018 | Woolfe | H04L 67/303 |
| 2019/0098118 A1* | 3/2019 | Utama | H04L 69/324 |
| 2019/0104057 A1 | 4/2019 | Goel et al. | |
| 2020/0014763 A1 | 1/2020 | Boon et al. | |
| 2020/0177589 A1* | 6/2020 | Mangalvedkar | H04L 67/12 |
| 2020/0220931 A1* | 7/2020 | Dinh | H04L 41/5019 |

OTHER PUBLICATIONS

"Data Center: Contrail Enterprise Multicloud for Fabric Management", Retrieved from: https://www.juniper.net/documentation/en_US/release-independent/solutions/information-products/pathway-pages/sg-009-contrail-enterprise-multicloud.pdf, Feb. 28, 2020, 103 Pages.

Coulter, et al., "Connect and communicate with services in Service Fabric", Retrieved from: https://docs.microsoft.com/en-us/azure/service-fabric/service-fabric-connect-and-communicate-with-services, Nov. 1, 2017, 10 Pages.

"Reference Architecture for IoT Device Capability Exposure", In International Telecommunication Union, Y.4115, Apr. 29, 2017, 26 Pages.

Shi, et al., "Cross-Layer QoS Enabled SDN-Like Publish/Subscribe Communication Infrastructure for IoT", In Journal of China Communications, vol. 17, Issue 3, Mar. 2020, pp. 149-167.

"International Search Report & Written Opinion Issued in PCT Application No. PCT/US21/038323", dated Sep. 29, 2021, 15 Pages.

Pramukantoro, et al., "Implementation of Neighbor Discovery Protocol as Communication Initiator Between Sensor Nodes and IoT Middleware in 6LoWPAN Networks", In Proceedings of the International Conference on Sustainable Information Engineering and Technology, Sep. 28, 2019, pp. 191-195.

Bansal, et al., "IoT Ecosystem: A Survey on Devices, Gateways, Operating Systems, Middleware and Communication", In International Journal of Wireless Information Networks, Feb. 13, 2020, pp. 340-364.

\* cited by examiner

GLOBAL INTERNET OF THINGS (IOT) CONNECTIVITY FABRIC

BACKGROUND

Internet of Things (IoT) infrastructures establish connectivity between the IoT devices and remote applications. As the IoT devices move around, the applications for the IoT devices do not move. Today there are IoT hubs in each region and if the IoT device moves to a different location, the IoT device first needs to be programmed to the new IoT hub. In addition, the application needs to change to pick up data from the new IoT hub. Currently, a customer does not have control over how the data is transmitted to the IoT device. For example, if an IoT device is located in China and an application is located in the United States, the customer does not have control to which in-between application layers the IoT device telemetry goes through.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to an internet of things (IoT) system. The IoT system may include a middleware layer including IoT middleware in communication with an application that provides services to at least one IoT device, wherein the at least one IoT device includes metadata with a communication channel declared for communicating with the application. The IoT system may include a connectivity fabric layer including: a plurality of global IoT connectivity fabric nodes that create a global IoT connectivity fabric that enables establishment of the communication channel between the application and the at least one IoT device, wherein the plurality of global IoT connectivity fabric nodes communicate using inter geographies message bus traffic; a device session manager that manages channel subscription information for the communication channel from the metadata, wherein the application subscribes to the communication channel; and a global IoT connectivity fabric node discovery service that provides the at least one IoT device dynamic discovery of a nearby global IoT connectivity fabric node of the plurality of global IoT connectivity fabric nodes, wherein the at least one IoT device establishes a network connection with the nearby global IoT connectivity fabric node to communicate with the application.

Another example implementation relates to a method for sending a command from an application to at least one internet of things (IoT) device, the method executed by an IoT system including a global IoT connectivity fabric with a plurality of global IoT connectivity fabric nodes. The method may include connecting the at least one IoT device to a nearby global IoT connectivity fabric node of the plurality of global IoT connectivity fabric nodes, wherein the at least one IoT device declares a communication channel for receiving information from the application. The method may include publishing device session information for the at least one IoT device with connectivity information for the at least one IoT device and channel subscription information for the communication channel. The method may include receiving, at the global IoT connectivity fabric, a command from the application for the IoT device, wherein the application subscribes to the communication channel declared by the at least one IoT device. The method may include sending, from the nearby global IoT connectivity fabric node, the command to the IoT device using the communication channel.

Another example implementation relates to a method for sending telemetry data from an internet of things (IoT) device to an application, the method executed by an IoT system including a global IoT connectivity fabric with a plurality of global IoT connectivity fabric nodes. The method may include connecting the IoT device to a nearby global IoT connectivity fabric node of the plurality of global IoT connectivity fabric nodes, wherein the IoT device declares a communication channel for publishing information from the IoT device. The method may include publishing device session information with connectivity information for the IoT device and channel subscription information for the communication channel. The method may include receiving, at the nearby global IoT connectivity fabric node, the telemetry data from the IoT device, wherein the application subscribes to the communication channel declared by the IoT device. The method may include sending the telemetry data to the application using the communication channel, wherein the global IoT connectivity fabric establishes the communication channel between the IoT device and the application.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
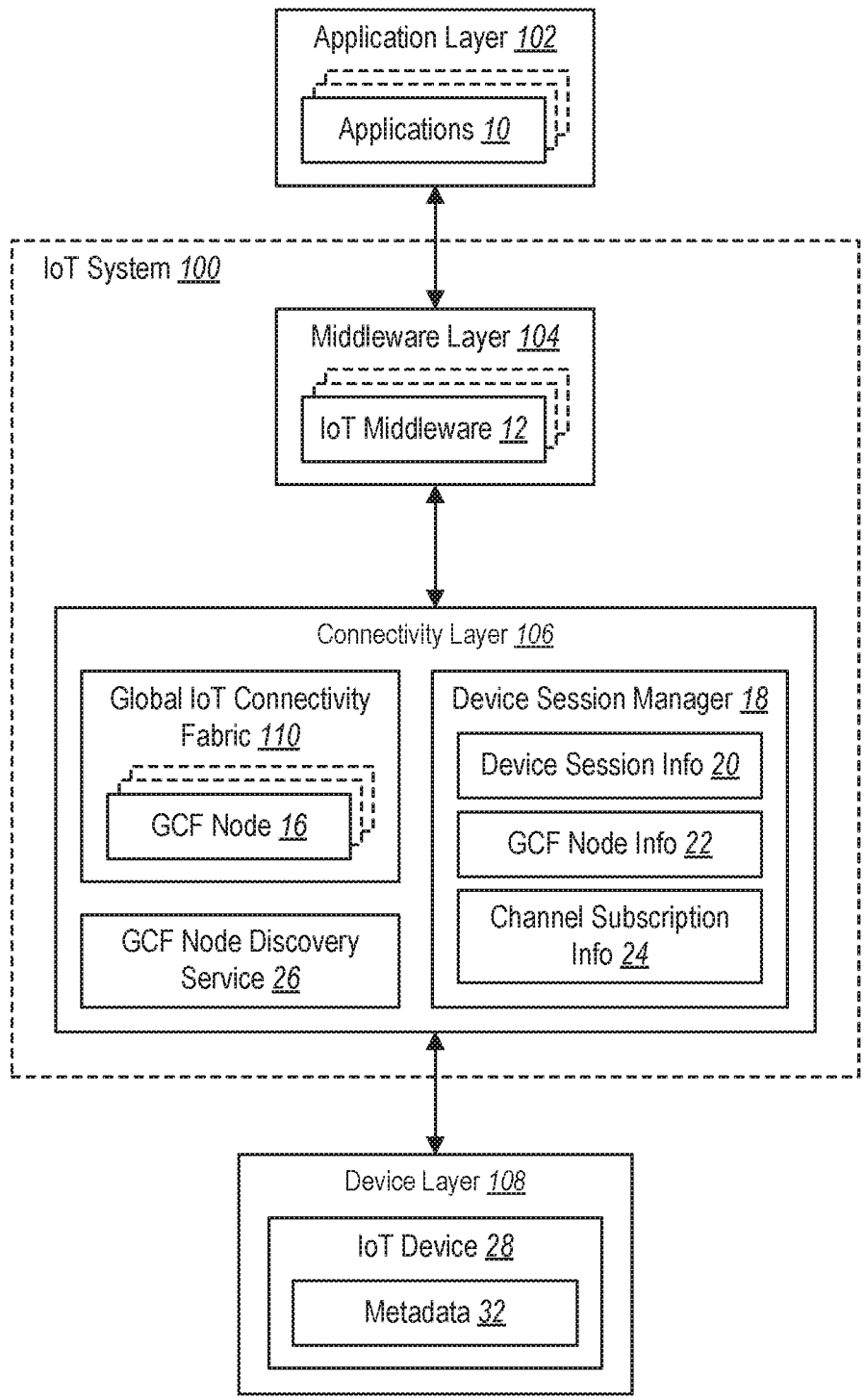
FIG. 1 illustrates a layered view of an example IoT system in accordance with an implementation of the present disclosure.

This disclosure generally relates to linking IoT devices with cloud services. Distributed nature of IoT devices is a reality when building connected logistics, such as fleets of trucks or ships that haul goods from one country to another. IoT infrastructures establish connectivity between the IoT devices and remote applications. As the IoT devices move around, the applications for the IoT devices do not move. Today there are IoT hubs in each region and if the IoT device moves to a different location, the IoT device first needs to be programmed to the new IoT hub. In addition, the application needs to change to pick up data from the new IoT hub. The IoT hub is a device homing endpoint for IoT devices to connect to for sending and receiving information. Applications are typically aware of which IoT hub the IoT devices are connected to and the applications will read the data from the identified IoT hub.

For example, an application on a cellphone may be used to open or close a car door. The IoT device may be the car or a smart door lock. An in-between infrastructure from the IoT hub may be used to facilitate communications between the application and the IoT device. Currently, for communications to occur between the application, the IoT device, and the IoT hub must be aware of one another ahead of time.

The present disclosure relates to a globally connected fabric of nodes of device connectivity endpoints whose sole responsibility is to establish dial tone with the device session manager nodes. The messaging route and procession disposition of the information can be declaratively provided by the developers depending on, for example, customer needs, the processing needs, and/or the data sovereignty needs. An IoT device connects with the nearest or a nearby connectivity global IoT connectivity fabric (GCF) node (similar to a cell tower in cellphone connectivity) and that GCF node knows the owner of the device session and establishes a messaging relationship. The GCF node forwards and receives network traffic. The IoT devices may be agnostic of the infrastructure that the IoT device is connecting to (e.g., the GCF node). The present disclosure includes several practical applications that provide benefits and/or solve problems associated with linking IoT devices with cloud services.

The connectivity fabric nodes may own the device network connection. If one node is down, the IoT device may retry and pick up a next available node. Besides cached session node information, the connectivity fabric nodes are completely stateless. Through a dynamically updated connectivity directory, the session node will always be able to send and receive traffic to and from the IoT device. Connectivity Fabric Nodes may form a graph between geographies and regions through messaging bus topology for well controlled interactions that may be governed by declarative controls to enforce customer data sovereignty and/or regulatory needs.

The session manager nodes may be stateful and may publish application programming interfaces (API)s for the applications to interact with IoT devices. The IoT device's last known state is known to the session manager all the time with some advertised latency. The session manager nodes always know how to communicate with the IoT device through the discovery of the connectivity fabric node that owns the device network connection. The session manager nodes may also form a graph depending on the application needs.

The present disclosure allows IoT devices to not have prior knowledge of which GCF node to connect to ahead of time and allows IoT devices to locate or find a nearest or nearby connectivity endpoint; the information from the connectivity endpoint will flow to the application no matter where the application is located. For example, if an IoT device is changing locations, the IoT devices may locate a connectivity endpoint in a new location to connect to without having prior knowledge of which GCF nodes to connect with. In addition, if an IoT device is stationary and a connectivity endpoint goes down or is disabled, the IoT device may locate another connectivity endpoint to connect with nearby without having to have prior knowledge of the GCF nodes nearby the IoT device.

One example use case with the present disclosure may include an IoT system with a globally distributed IoT device population that may be stationary (e.g., oil drilling and producing all over the world) or IoT devices that move (e.g., connected logistics, such as, ships, containers, and/or trucks). In addition, the IoT system may include an application that provides services to the IoT devices. The application may be located in one geography due to data sovereignty and user population of the IoT system. Since the IoT device population is distributed globally, a highly available and disaster proof solution is needed. For example, information from some IoT devices may be processed locally while for other IoT devices, the processing may occur at a remote geography. The present disclosure may allow all the information pathways needed for enabling the above communications between the globally distributed IoT devices and the application to be declared by developers through a control plane. The control plane may include any functionality that enables infrastructure setup for the IoT devices, such as, but not limited to, registering the IoT device, setting policies for message pathways, and/or setting access control policies on the IoT devices.

The present disclosure may enable global connectivity with developer controlled state management and a highly reliable IoT platform which will allow customers to achieve declarative high availability and disaster recoverability based on the need of the application. For example, a smart mousetrap and a switchgear in a power grid have different high availability (HA) and/or disaster recovery (DR) requirements and COGS implications. The present disclosure allows customers to achieve objectives while the IoT system absorbs the complexity of global connectivity.

As such, no matter where the applications and/or the IoT devices are located, the applications and/or IoT devices may always find each other through dynamic GCF node discovery, information path policies, and/or shared device metadata.

Referring now to FIG. 1, illustrated is an example layered view of an IoT system 100 for use with connecting a plurality of IoT devices 28 with one or more remote applications 10 that provide cloud services. IoT system 100 may facilitate communications between applications 10 and the IoT devices 28.

IoT system 100 may communicate with an application layer 102 with a plurality of applications 10. Example applications 10 may include customer management or monitoring applications for monitoring and managing IoT devices 28 and/or analytical applications used for running the physical environments efficiently. The cloud services may include, but are not limited to, performance monitoring, command and control, and/or analytics measuring. The application layer 102 may be owned by one or more customers of the IoT system 100.

The application layer 102 may communicate with an IoT middleware layer 104 of IoT system 100. The IoT middleware layer 104 may include a plurality of IoT middleware 12 devices, such as, but not limited to, data pipeline nodes, event processor nodes, security extensions, application extensions, digital twins, and/or topology nodes.

The IoT middleware layer 104 may communicate with a connectivity layer 106 of IoT system 100. The connectivity layer 106 may include a plurality of GCF nodes 16 that create a global IoT connectivity fabric 110. A GCF node 16 is a cloud gateway node with which the IoT devices 28 establishes a connection using, for example, any of the hypertext transfer protocol secure (HTTPS), advanced message queuing protocol (AMQP), and/or message queuing telemetry transport (MQTT) protocols. A transport layer security (TLS) session terminates at the GCF node 16. The connectivity layer 106 may be a layer 7 router of messages within the IoT system 100.

The connectivity layer 106 may also include a GCF node discovery service 26 that may be used by IoT devices 28 to discover GCF nodes 16 to connect with. The GCF nodes 16 may form a graph between geographies and regions through a messaging bus topology for well controlled interactions that may be governed by declarative controls to enforce customer data sovereignty and/or regulatory needs.

Any IoT device 28, stationary or moving, may use a GCF node discovery service 26 to dynamically discover one or more GCF nodes 16 nearby to connect with. One example may include an IoT device 28 implicitly discovering a nearest GCF node 16 through Domain Name System (DNS) proximity. Discovering of GCF nodes 16 nearby IoT device 28 using DNS proximity may incur DNS infrastructure induced latency. Another example may include an IoT device 28 discovering GCF node 16 located nearby by explicitly calling the GCF node discovery service 26 to find a nearest GCF node 16.

By using the GCF node discovery service 26 to identify one or more GCF nodes 16 to connect with, IoT device 28 may locate or find a nearby connectivity endpoint and the information from the connectivity endpoint will flow to the application 10 no matter where the application 10 is located. For example, if an IoT device 28 changes locations, the IoT device 28 may locate a connectivity endpoint in a new location without having prior knowledge of which connectivity endpoints to connect with. In addition, if an IoT device 28 is stationary and a connectivity endpoint goes down or is disabled, the IoT device 28 may locate another connectivity endpoint to connect with nearby without having prior knowledge of the connectivity endpoints nearby the IoT device 28.

The connectivity layer 106 may also include a device session manager 18 that may provide the device session information 20 for the IoT devices 28. The device session information 20 may include, for example, a connectivity state of the IoT device 28. The device session information 20 may be synchronized upon device connectivity. In addition, the device session manager 18 may associate the GCF node information 22 of the GCF node 16 currently connected to the IoT device 28 with the device session information 20. The device sessions information 20 may be updated as the connectivity status of the IoT device 28 changes (e.g., disconnects or connects) and/or the IoT device 28 moves locations and connects with a different GCF node 16. As such, the device session information 20 reflects a current state of overall connectivity of the IoT device 28.

In addition, the device session manager 18 may include channel subscription information 24 received from the device metadata 32. The channel subscription information 24 may identify which channels the IoT device 28 declared for sending and/or receiving information. For example, the IoT device 28 may specify a publisher channel to send data, such as telemetry data and/or events observed by the IoT device 28. In addition, the IoT device 28 may specify one or more channels that the IoT device 28 is subscribed to for receiving commands or other control messages from applications 10 and/or services. The IoT device 28 may also specify one or more channels for receiving broadcast messages from applications 10 and/or services.

The GCF nodes 16 may own the device network connection. If one GCF node 16 is down, the IoT device 28 may retry and pick up a next available GCF node 16. Besides cached session node information, the GCF nodes 16 are completely stateless. Through a dynamically updated device session manager 18, the GCF nodes 16 will always be able to send and receive traffic to and from the IoT device 28.

The device session manager 18 may be stateful and may publish application programming interfaces (API)s for the applications 10 to interact with IoT devices 28. The IoT device 28 last known state is known to the device session manager 18 with some advertised latency. The device session manager 18 communicates with the IoT devices 28 through the discovery of the GCF node 16 that owns the device network connection. The device session manager 18 may also form a graph depending on the application 10 needs.

The connectivity layer 106 may communicate with a device layer 108. The device layer 108 may include a plurality of IoT devices 28. IoT devices 28 may include any device with a sensor and/or an actuator or any edge gateway that facilitates communications with remote services. The IoT devices 28 may include, but are not limited to, the sensors and gateways installed at buildings, pipelines, factories, pumping stations, homes, trucks, mines, and/or ships. The IoT devices 28 may be distributed in different geographic locations across the world.

Applications 10 may use the IoT system 100 to send messages to IoT devices 28 and/or receive messages from IoT devices 28. In addition, IoT devices 28 may use the IoT system 100 to send messages to applications 10 and/or receive messages from applications 10. As such, the IoT system 100 may be used to link IoT devices 28 with cloud services provided by one or more applications 10.

The global IoT connectivity fabric 110 may support different types of messaging patterns between the IoT devices 28 and the IoT middleware 12. One example messaging pattern supported by the global IoT connectivity fabric 110 may include a publish message. An IoT device 28 and/or a cloud hosted service by applications 10 may publish messages to other actors in the IoT system 100. For example, the IoT devices 28 and/or applications 10 may have insights and/or other information to share with the rest of the actors in the IoT system 100. The actors may include IoT devices 28, such as, but not limited to, smart trash cans, smart mouse traps, smart homes, and/or air quality monitoring sensors. The actors may also include services that send commands to devices in the IoT system 100 by publishing a command payload to the device specific channel.

Another example messaging pattern supported by the global IoT connectivity fabric 110 may include a subscribe message. An IoT device 28, processing pipeline nodes, and/or a cloud hosted service by applications 10 may subscribe to channels for receiving messages necessary for operations. For example, an event processor may want to know when a smart trashcan is full, a motor vibration is out of bounds, air quality at a national park is not safe, and/or a mouse is trapped in smart mouse trap. A time-series service in the backend will subscribe to all the telemetry events for enabling time-series analytics. A digital twin service may also care about certain system events like subscription event to channels so that distributed publication of messages can be implemented.

Another example messaging pattern supported by the global IoT connectivity fabric 110 may include a request and response message. Data driven IoT devices 28, such as, but not limited to, vending machines, handheld scanners (validate the boarding pass, validate the coupon, etc.), and/or other data driven equipment and devices require backend application programming interface (API) support for serving data. For example, a coupon scanner may call a remote application through an API, such as retailApp.isValid(couponId), or an IoT device 28 may call an API, such as myApp.getSecurityPolicies(deviceId), for downloading security policies before going offline. Additional examples of API calls originating from IoT devices 28 may include, but are not limited to, GetProducts and IsBoardingPassValid. A causal relationship exists between the request and response pairs, and thus, the request and response message mode of communication is different from the publish or subscribe models described above. Since the request and response model depends on the application 10, the global IoT connectivity fabric 110 may establish the dial tone between the application 10 and the IoT device 28 for enabling this type of interaction.

Another example messaging pattern supported by the global IoT connectivity fabric 110 may include streaming connections. The IoT devices 28 may open streaming connections to applications 10 mediated by the global IoT connectivity fabric 110. Example uses may include, but are not limited to, sonar equipment signals, video and audio surveillance, troubleshooting devices manually through SSH, and/or running on-demand remote diagnostics.

The IoT system 100 may use the global IoT connectivity fabric 110 to implement any preferences received for the communications pathways and/or declarative routes between the IoT devices 28 and the applications 10. For example, users of the IoT system 100 may be able to declare and/or tailor communication pathways or routes between the IoT devices 28 and the IoT middleware 206, 208 and the communication pathways or routes between the IoT middleware 206, 208 and the applications 10.

Metadata 32 may be created indicating any preferences received for the communications pathways or declarative routes received. For example, application program developers may create metadata 32 in response to information received from users indicating a preferred route for communications between IoT devices 28 and applications 10. IoT devices 28 may download metadata 32. Any component within the IoT system 100 that the IoT devices 28 may communicate with using the global IoT connectivity fabric 110 may have access to metadata 32.

When IoT devices 28 download metadata 32, metadata 32 may establish a connectivity type for the IoT devices 28. The IoT devices 28 may use the information provided in metadata 32 to connect to a nearby GCF node 16 in the global IoT connectivity fabric 110. The connectivity layer 106 may have access to the metadata 32 and the global IoT connectivity fabric 110 may use metadata 32 to determine where to send information sent by the IoT devices 28.

The application layer 102 may also have access to metadata 32 and may use metadata 32 to determine which data to accept from the IoT devices 28. For example, if the data originates from an IoT device 28 identified by metadata 32, the application layer 102 may accept the data and the applications 10 may receive the data from the IoT device 28. However, if the data originates from an IoT device 28 not included in metadata 32, the application layer 102 may reject the data and the application 10 may be unable to communicate with the IoT device 28. As such, metadata 32 may be used by the global IoT connectivity fabric 110, the IoT devices 28, the IoT middleware 12, and/or the applications 10 to implement any preferences or choices received for communication pathways or routes between the IoT devices 28 and applications 10.

The global connectivity layer 106 may provide matchmaker services between IoT devices 28 and services provided by one or more applications 10 based on one or more policies or preference received. As such, no matter where the IoT devices 28 are located at any point in time, the IoT devices 28 may use the global IoT connectivity fabric 110 to find an optimal layer 7 route to the application 10 for both telemetry and command traffic. While the IoT devices 28 may be distributed all over the world, through declarative routes, how traffic flows from the IoT devices 28 to the applications 10 may be controlled.

The global IoT connectivity fabric 110 may be completely stateless. As such, the global IoT connectivity fabric 110 may be deployed globally without worrying about state synchronization complexity. The connectivity layer 106 may be deployed in an individual scale unit as the connectivity layer 106 may have different scaling semantics than the services that consume information from the connectivity layer 106. The connectivity layer 106 may be completely abstract and may only understand the messaging constructs, such as, but not limited to, sessions, messages, channels, and/or streams.

By the global IoT connectivity fabric 110 being stateless and abstracted, the global IoT connectivity fabric 110 may be ubiquitous, reliable, available, disaster resilient, and/or perform well under diverse deployment situations. In addition, by global IoT connectivity fabric 110 being abstracted, increasingly concrete and stateful components can be stacked on top (e.g., in middleware layer 104) for a progressive customization required by domain specific applications 10.

The global IoT connectivity fabric 110 may implement the concept of a channel. The channel may be a transient construct that comes to life if there is at least one publisher or subscriber to the channel. The channel may be a logical messaging mode on top of a network connection owned by the global IoT connectivity fabric 110. One example network connection may include, but is not limited to, a physical transmission control protocol (TCP) connection. The client libraries of the global IoT connectivity fabric 110 may expose channels as well as the ability to unwrap the underlying socket for sending and receiving byte streams.

Applications 10 may declaratively specify any number of channels. The number of channels may be saved, for example, in metadata 32 available to the different components and/or devices of the IoT system 100. In addition, applications 10 may link the necessary telemetry and command processors in publish, subscribe, request/response, and/or streaming modes for the different channels through services stacked on top of the global IoT connectivity fabric 110. Such layering keeps the connectivity layer 106 simple and stateless (e.g., only transient publish and/or subscription state and in-flight buffers may be present in the connectivity layer 106) so that the global IoT connectivity fabric 110 may be deployed globally without the complexity of state synchronization.

Any stationary or moving IoT device 28 may connect to a GCF node 16 located nearby to send or receive information from the respective channels known a priori. One example may include an IoT device 28 implicitly discovering a nearby GCF node 16 through DNS proximity. Discovering GCF nodes 16 nearby IoT device 28 using DNS proximity may incur DNS infrastructure induced latency. Another example may include an IoT device 28 discovering a GCF node 16 located nearby by explicitly calling the GCF node discovery service 26 to find a nearby GCF node 16.

IoT devices 28 may select a GCF node 16 to connect to based on proximity to a location of the IoT devices 28. For example, the IoT devices 28 may select a GCF node 16 located the nearest to the IoT devices 28.

In another implementation, IoT devices 28 may use a quality of service criteria in selecting which GCF node 16 to connect with. For example, IoT devices 28 may discover a plurality of GCF nodes 16 located nearby IoT devices 28. IoT devices 28 may take into account additional quality of service criteria for the GCF nodes 16, such as, but not limited to, a load of the GCF node 16 (e.g., a total number of IoT devices 28 currently connected to the GCF node 16) and/or the performance characteristics of the GCF node 16, when selecting which GCF node 16 to connect with.

One example use case may include a container being shipped from China to the United States. The container may include an IoT device 28. When the container is in China, the IoT device 28 connects to the global IoT connectivity fabric 110 in China and communicates a location of the container. When the container arrives in the United States, the IoT device 28 connects to the global IoT connectivity fabric 110 in the United States and communicates a location of the container. Typically, applications 10 are located in a single location. As such, when an application 10 subscribes to the device data from the IoT device 28 associated with the container, no matter where the container is located, whenever the IoT device 28 connects to the global IoT connectivity fabric 110, the data from the IoT device 28 may be transmitted to the application 10 using the global IoT connectivity fabric 110.

The IoT devices 28 and the IoT services provided by the application 10 rely on simple channel APIs thereby making the entire interaction between the IoT devices 28 and the services provided by application 10 configurable declaratively. The channels can be part of a device model where the device definitions for the IoT devices 28 may have a linked channel definition for communications.

For example, an IoT device 28 is added in the shared device registry. At the time of modeling, the IoT device 28 may be annotated with the necessary channels based on the communications needs. The services provided by application 10 and the IoT device 28 may use the same channel monikers for a loosely coupled interaction through publish and/or subscribe semantics.

The global IoT connectivity fabric 110 may be a ubiquitous IoT connectivity infrastructure whose role is to establish the dial tone between the applications 10 and the IoT devices 28. An IoT device 28 may always find a nearby endpoint for publishing and subscribing to IoT traffic using the global IoT connectivity fabric 110. Developers may be able to control the location of IoT devices 28, services provided by applications 10, and the network interaction through policies exposed by the global IoT connectivity fabric 110. For example, a policy can say IoT devices 28 located in Europe may only connect cloud services hosted in data centers located in Europe. Due to the separation of application state from the transient device session state, high availability (HA) and/or disaster recovery (DR) of the global IoT connectivity fabric 110 becomes simpler.

As such, no matter where the applications 10 and/or the IoT devices 28 are located, the applications 10 and/or IoT devices 28 may always find each other through dynamic GCF node 16 discovery, information path policies, and/or shared device metadata 32.

Figure 2:
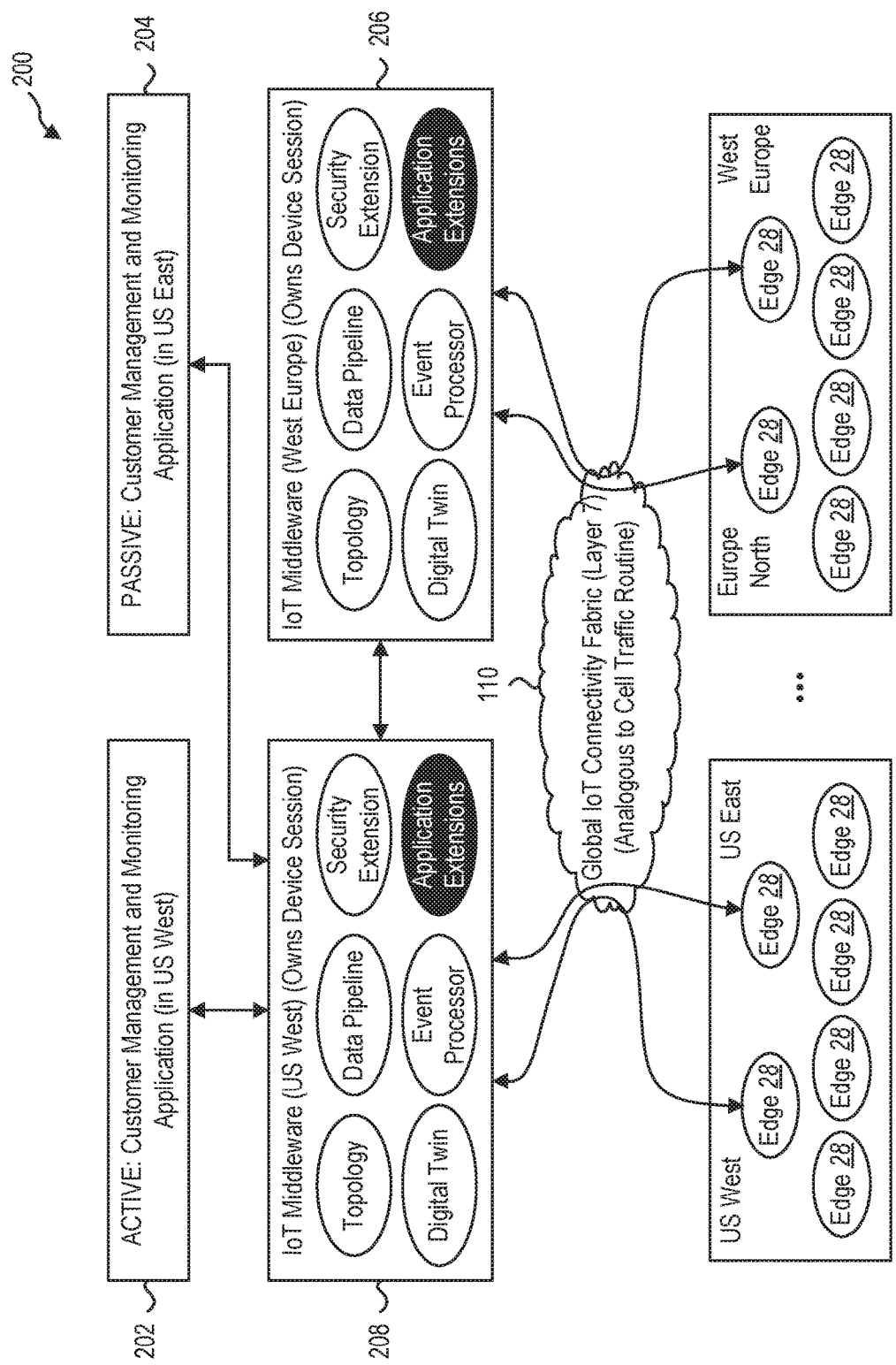
FIG. 2 illustrates an example IoT system with a distributed IoT middleware deployment in accordance with an implementation of the present disclosure.

Referring now to FIG. 2, illustrated is an example of IoT system 200 with a distributed IoT middleware deployment using a global IoT connectivity fabric 110 to connect one or more IoT devices 28 to one or more applications 10. For example, the middleware layer 104 may have IoT middleware 206 located in west Europe and IoT middleware 208 located in the west coast of the United States. The global IoT connectivity fabric 110 may be part of the connectivity layer 106 and may be used to link remote IoT devices 28 with cloud services provided by one or more applications 10. IoT system 200 may use the different layers (e.g., middleware layer 104 and connectivity layer 106) and/or components discussed in FIG. 1.

The IoT devices 28 may send messages to the global IoT connectivity fabric 110 and/or may receive messages from the global IoT connectivity fabric 110. The global IoT connectivity fabric 110 may be used to establish connections between the plurality of IoT devices 28 with IoT middleware 206, 208. The connections may enable the IoT devices 28 to communicate with IoT middleware 206, 208 by sending and/or receiving messages between the IoT devices 28 and the IoT middleware 206, 208.

IoT middleware 206, 208 may be in communication with one or more applications 10 providing cloud services to IoT devices 28. The IoT system 100 may have an active customer management and monitoring area 202 located in the west coast of the United States and a passive customer management and monitoring area 204 located in the east coast of the United States.

The active management and monitoring area 202 may include a plurality of applications 10 that are actively in communication with IoT middleware 206, 208. As such, messages sent from applications 10 for IoT devices 28 may be transmitted to IoT middleware 206, 208. In addition, any messages received by IoT middleware 206, 208 from IoT devices 28 may be sent to applications 10 within the active management and monitoring area 202.

The passive customer management and monitoring area 204 may include a plurality of applications 10 that are not actively in communication with IoT middleware 206, 208. As such, applications 10 in the passive management monitoring area 204 may not send messages to IoT devices 28 and/or may not receive messages from IoT devices 28.

The global connectivity layer 106 may provide matchmaker services between IoT devices 28 and services provided by one or more applications 10 based on one or more policies or preferences received.

One example is illustrated for using the global IoT connectivity fabric 110 to connect applications 10 located in the west coast of the United States with IoT devices 28 located in the United States and in Europe. The example may include the user choosing to connect the IoT devices 28 located in the United States with IoT middleware 208 located in the west coast of the United States, and the user choosing to connect the IoT devices 28 located in Europe with IoT middleware 206 located in the west of Europe. For example, the global IoT connectivity fabric 110 may connect the IoT devices 28 located in the west coast and the east coast of the United States with state machines hosted by IoT middleware 208. The global IoT connectivity fabric 110 may also connect the IoT devices 28 located in the north and west of Europe with state machines hosted by IoT middleware 206 in the west of Europe. IoT middleware 208 and IoT middleware 206 may both communicate with applications 10 located in the active customer and management area 202 located in the west coast of the United States.

Another example (not illustrated) for connecting applications 10 located in the west coast of the United States with IoT devices 28 located in the United States and in Europe may include a user declaring a communication route for the IoT devices 28. For example, the user may specify that the IoT devices 28 located in north and west Europe and the IoT devices 28 located in the west and east coast of the United States communicate with IoT middleware 208 located in the west coast of the United States. The global IoT connectivity fabric 110 may connect the IoT devices 28 located in the west coast and the east coast of the United States and the IoT devices 28 located in north and west Europe with state machines hosted by IoT middleware 208. IoT middleware 208 may communicate with applications 10 located in the active customer and management area 202 located in the west coast.

As such, no matter where the IoT devices 28 are located at any point in time, the IoT devices 28 may use the global IoT connectivity fabric 110 to find an optimal layer 7 route to the application 10 for both telemetry and command traffic. While the IoT devices 28 may be distributed all over the world, through declarative routes, how traffic flows from the IoT devices 28 to the applications 10 may be controlled.

Figure 3:
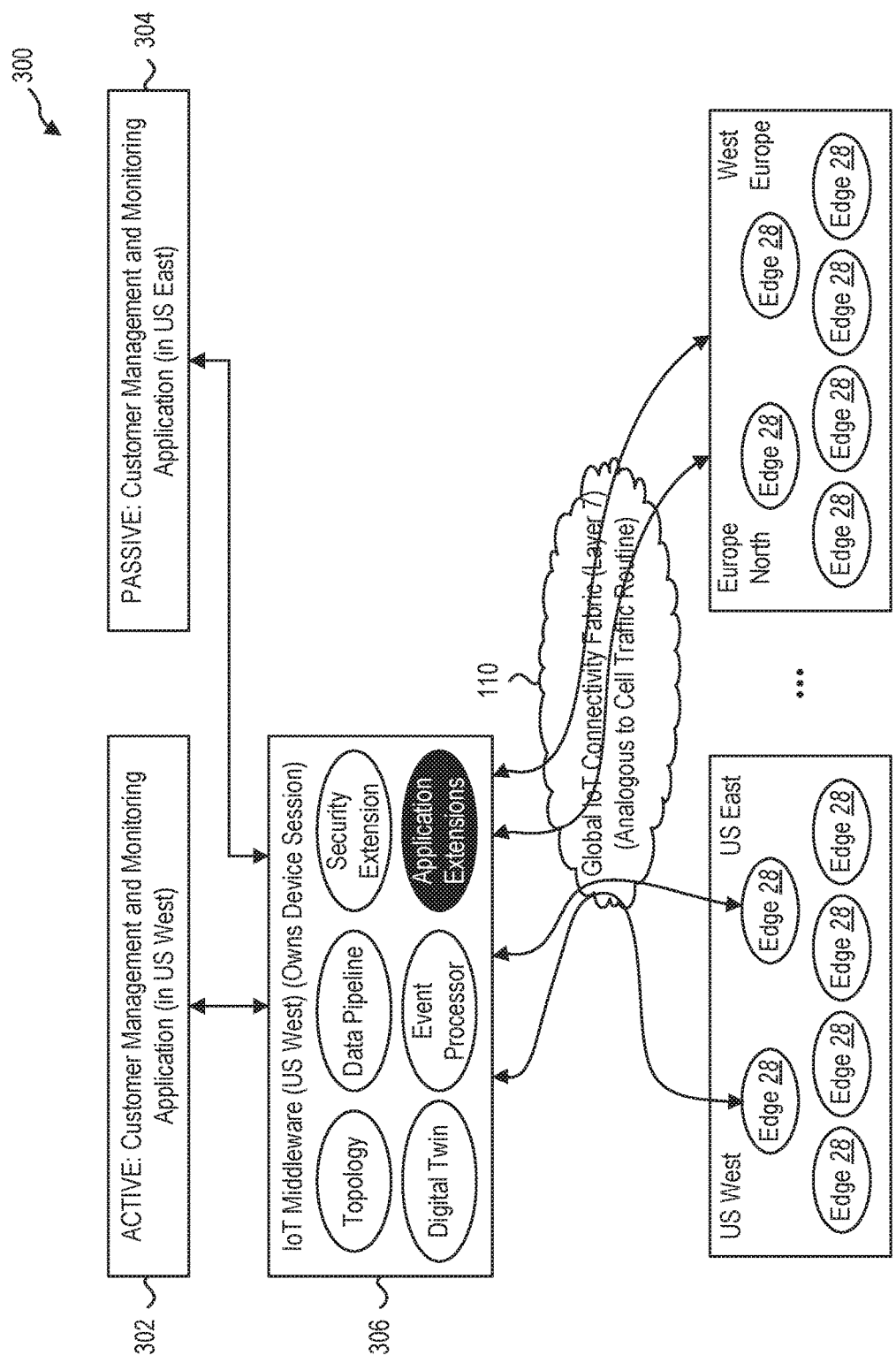
FIG. 3 illustrates an example IoT system with a unified IoT middleware deployment in accordance with an implementation of the present disclosure.

Referring now to FIG. 3, illustrated is an example of IoT system 300 with a unified IoT middleware deployment using a global IoT connectivity fabric 110 to connect one or more IoT devices 28 to one or more applications 10. For example, the middleware layer 104 may have IoT middleware 306 located in the west coast of the United States. The global IoT connectivity fabric 110 may be part of the connectivity layer 106 and may be used to link remote IoT devices 28 with cloud services provided by one or more applications 10. IoT system 300 may use the different layers (e.g., middleware layer 104 and connectivity layer 106) and/or components discussed in FIG. 1.

The IoT devices 28 may send messages to the global IoT connectivity fabric 110 and/or may receive messages from the global IoT connectivity fabric 110. The global IoT connectivity fabric 110 may be used to establish connections between the plurality of IoT devices 28 with IoT middleware 306. For example, IoT middleware 306 may be located in the west coast of the United States. The connections may enable the IoT devices 28 to communicate with IoT middleware 306 by sending and/or receiving messages between the IoT devices 28 and IoT middleware 306.

IoT middleware 306 may be in communication with one or more applications 10 providing cloud services to IoT devices 28. IoT system 300 may have an active customer management and monitoring area 302 located in the west coast of the United States and a passive customer management and monitoring area 304 located in the east coast of the United States.

The active management and monitoring area 302 may include a plurality of applications 10 that are actively in communication with IoT middleware 306. As such, messages sent from applications 10 for IoT devices 28 may be transmitted to IoT middleware 306. In addition, any messages received by IoT middleware 306 from IoT devices 28 may be sent to applications 10 within the active management and monitoring area 302.

The passive customer management and monitoring area 304 may include a plurality of applications 10 that are not actively in communication with IoT middleware 306. As such, applications 10 in the passive management monitoring area 304 may not send messages to IoT devices 28 and/or may not receive messages from IoT devices 28.

The global connectivity layer 106 may provide matchmaker services between IoT devices 28 and services provided by one or more applications 10 based on one or more policies or preference received. For example, a user may specify that the IoT devices 28 located in north and west Europe and the IoT devices 28 located in the west and east coast of the United States communicate with IoT middleware 306 located in the west coast of the United States.

As such, the global IoT connectivity fabric 110 may connect the IoT devices 28 located in the west coast and the east coast of the United States and the IoT devices 28 located in north and west Europe with state machines hosted by IoT middleware 306. IoT middleware 306 may communicate with applications 10 located in the active customer and management area 302 located in the west coast.

No matter where the IoT devices 28 are located at any point in time, the IoT devices 28 may use the global IoT connectivity fabric 110 to find an optimal layer 7 route to the application 10 for both telemetry and command traffic. While the IoT devices 28 may be distributed all over the world, through declarative routes, how traffic flows from the IoT devices 28 to the applications 10 may be controlled.

Figure 4:
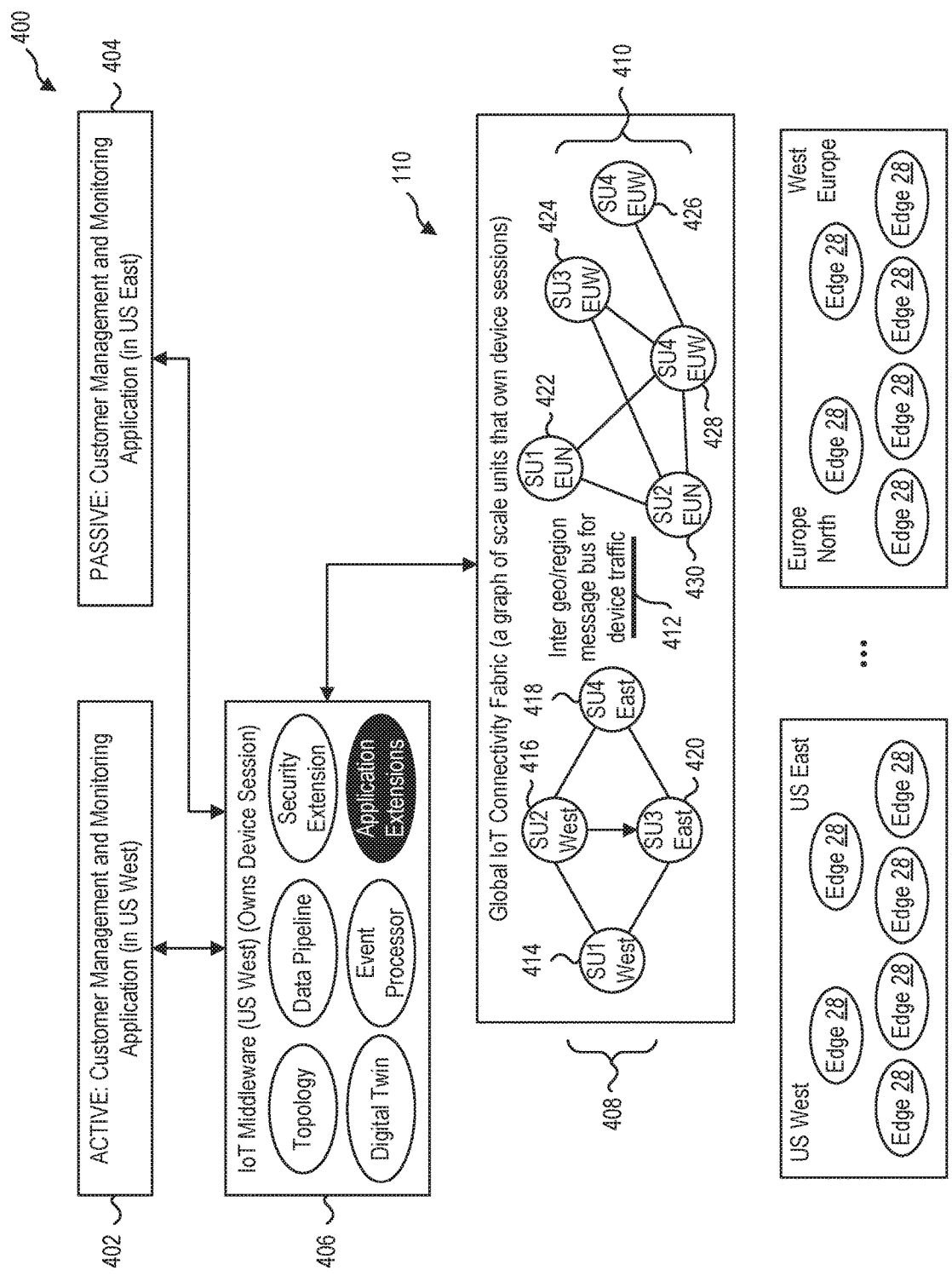
FIG. 4 illustrates an example IoT system with a global IoT connectivity fabric scale unit deployment model in accordance with an implementation of the present disclosure.

Referring now to FIG. 4, illustrated is an example of IoT system 400 using a global IoT connectivity fabric 110 with a global IoT connectivity fabric scale unit deployment model to connect one or more IoT devices 28 to one or more applications 10. For example, the middleware layer 104 may have IoT middleware 406 located in the west coast of the United States. The global IoT connectivity fabric 110 may be part of the connectivity layer 106 and may be used to link remote IoT devices 28 with cloud services provided by one or more applications 10. IoT system 400 may use the different layers (e.g., middleware layer 104 and connectivity layer 106) and/or components discussed in FIG. 1.

The global IoT connectivity fabric 110 may include one or more graphs 408, 410 of GCF nodes 414, 416, 418, 420, 422, 424, 426, 428, 430. Graphs 408, 410 may be in different geographies and/or regions and graphs 408, 410 may communicate with each other through messaging bus topology for well controlled interactions that may be governed by declarative controls to enforce customer data sovereignty and/or regulatory needs.

Graph 408 may include GCF nodes 414, 416, 418, 420 and graph 410 may include GCF nodes 422, 424, 426, 428, 430. Graph 408 may be located in the United States and graph 410 may be located in Europe. Graphs 408 and 410 may communicate through inter geographies and/or region message bus traffic 412.

IoT middleware 406 may communicate with applications 10 in the active management and monitoring area 402. As such, messages sent from applications 10 for IoT devices 28 may be transmitted to IoT middleware 406. In addition, any messages received by IoT middleware 406 from IoT devices 28 may be sent to applications 10 within the active management and monitoring area 402. The passive customer management and monitoring area 404 may include a plurality of applications 10 that are not actively in communication with IoT middleware 406.

For example, IoT devices 28 in Europe may transmit telemetry information to application 10 by connecting with one or more of the GCF nodes 422, 424, 426, 428, 430 in graph 410 and sending the telemetry information to the GCF nodes 422, 424, 426, 428, 430. IoT middleware 406 may communicate with GCF node 416 in graph 408. Since IoT middleware 406 is communicating with GCF node 416, graph 410 may transmit the receive telemetry to graph 408, where GCF node 416 is located, using inter geographies and/or region message bus traffic 412. GCF node 416 may receive the telemetry information from IoT device 28 and may transmit the telemetry information to IoT middleware 406. IoT middleware 406 may send the telemetry information to application 10.

As such, no matter where the IoT devices 28 are located at any point in time, the IoT devices 28 may use the global IoT connectivity fabric 110 to find an optimal layer 7 route to the application 10 for both telemetry and receiving command traffic. While the IoT devices 28 may be distributed all over the world, through declarative routes, how traffic flows from the IoT devices 28 to the applications 10 may be controlled.

Figure 5:
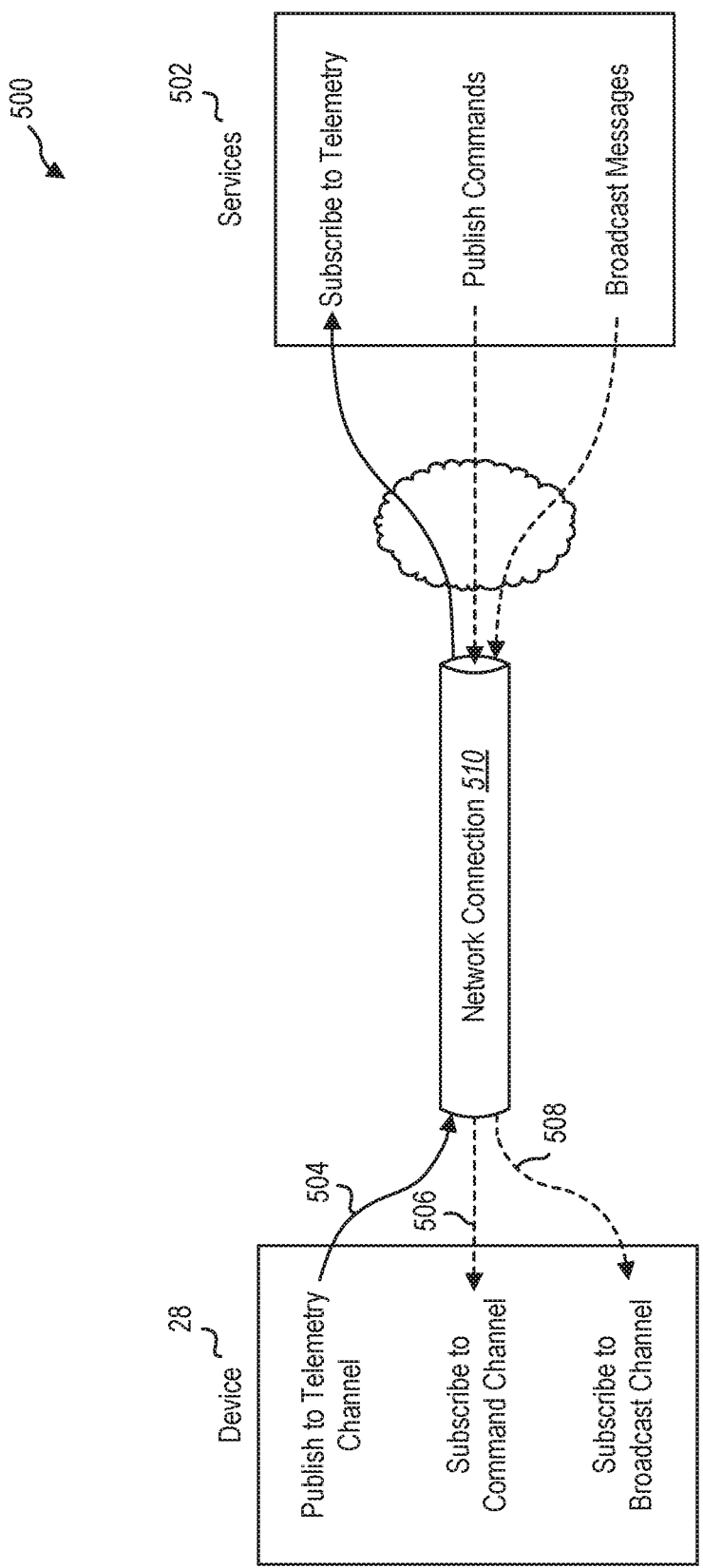
FIG. 5 illustrates an example channel architecture for use with an IoT system of the present disclosure.

Referring now to FIG. 5, an example channel architecture 500 for use with global IoT system 100 may include one or more IoT devices 28 using channel architecture 500 to communicate with one or more services 502 provided by one or more applications 10. A channel is an application layer 102 concept to group messages and enable routing between channels through a publish and subscribe pattern. Channel architecture 500 may allow multiple channels 504, 506, 508 on a single network connection 510 to ensure IoT devices 28 conserve power. An IoT device 28 may publish and subscribe to multiple channels to cover the necessary functionality. While three channels 504, 506, 508 are illustrated, a fewer number of channels may be used or more channels may be used.

In channel architecture 500, IoT device 28 may open three channels 504, 506, 508 to send telemetry data, receive commands, and/or listen to any broadcast messages. For example, channel 504 may be a publisher channel used by IoT device 28 to send or publish telemetry data to services 502 and/or applications 10. Channel 506 may be a subscriber channel used by IoT device 28 to receive commands from services 502 and/or applications 10. Channel 508 may be a broadcast channel used by IoT devices 28 to listen to any broadcast messages from services 502 and/or applications 10.

Application 10 and/or services 502 may subscribe to channel 504 to receive telemetry data and/or other information sent from IoT devices 28. In addition, application 10 and/or services 502 may publish commands using channel 506 to IoT devices 28. Application 10 and/or services 502 may also send broadcast messages to IoT devices 28 using channel 508.

Channel architecture 500 may decouple the communications layer from the application semantics so that, a telemetry only IoT device 28 may only publish to the telemetry channel 504 while a hybrid IoT device 28 (e.g., a sensor for measuring and an actuator for changing) may publish through the telemetry channel 504 while subscribing to the command channel 506. Due to the separation of device semantics from the communications layer, the following communications patterns may be added to the IoT platform of IoT system 100.

One communication pattern may relate to the publisher channel 504. Several IoT devices 28 may use the same channel credentials for the publisher channel 504 for sending sensor telemetry data from the IoT devices 28. Sensors only IoT devices 28 (e.g., read-only devices) may send telemetry data without requiring full-duplex communications. Examples of sensors only IoT device 28 may include, but are not limited to, remote sensors that measure pipeline flow at various segments of a gas pipeline, monitoring traffic flow in smart cities, and/or operational intelligence (OI) systems in process industries (e.g., oil refineries or water treatment centers) may only gather sensor telemetry for systems monitoring.

Having a telemetry channel only model may include the following benefits. Since the same publisher channel 504 may be used by many geographically distributed sensors only or read-only IoT devices 28 and non-device agents, the burden of maintaining pseudo device credentials for thousands of senders may be alleviated. The telemetry only publisher channel 504 may also prevent inadvertent permission escalation by preventing control commands from flowing back into the IoT devices 28 in cases where the IoT devices 28 also have actuators. Since the IoT device 28 is in control, the IoT device 28 may create a request-response channel and terminate the request-response channel right after the IoT device 28 receives the information needed. In addition, the telemetry channel only model may help the modeling of real-world scenarios where hundreds of IoT devices 28 connect through a single gateway. The gateway may create the necessary telemetry only publisher channel 504 based on the messaging semantics of the underlying IoT devices 28.

Another communication pattern may relate to the subscriber channel 508. Command and control may be integral elements of IoT systems. The commands can be sent to an individual IoT device 28 or may be broadcast through a broadcast channel 508 if largescale control/reconfiguration of IoT devices 28 may be required. Micro command and control may be synonymous with direct control of a single IoT device 28 while a Macro command and control involves the control of large IoT device populations.

Since publish and subscribe may be at the core of the IoT systems, the continuum of scenarios between the micro and macro control may be implemented. For example, actuator only IoT devices 28 may not need the telemetry publisher channel 504 and hence may only subscribe to the publisher channel 506 for publishing commands to the respective IoT devices 28. Moreover, the IoT device population may also be global due to the ubiquitous nature of the connectivity layer 106.

Another communication pattern may relate to a request-response channel. IoT devices 28 may request information and one of the GCF nodes 16 forwards the request to the appropriate application layer extension plugged into GCF layer. Data driven IoT devices 28 require information from master data sources to function. One example may include data driven IoT devices 28 requesting security and information governance policies from the global IoT connectivity fabric (GCF) 110. The global IoT connectivity fabric 110 responds with policies and evaluation engine updates for the IoT devices 28. Another example may include data driven IoT devices 28 requesting functional data (e. g., a bar code scanner may check with an IoT Hub to see if the scanned coupon is valid in retail scenarios, a Redbox kiosk may request information about the latest movies to be browed by customers, and/or a data driven IoT device 28 may request the latest configuration settings for sensor thresholds). The global IoT connectivity fabric (GCF) 110 provides the connectivity between the applications 10 providing the management and monitoring services for the responses to the requests sent by the IoT devices 28.

Another communication pattern may relate to a full-duplex channel. When sensors and actuators are fused into a single logical abstraction (e.g., a single IoT device 28), then such an IoT device 28 may create a full duplex channel and mux-demux the outgoing telemetry data and received commands respectively. The services and/or application layer 102, with the aid of the gateway-device relationships in the topology, may be able to interpret the telemetry and may also dispatch the commands to the correct IoT device 28 through the respective channel.

Another communication pattern may relate to a streaming channel. In an implementation, the messaging layer may be enhanced to receive video and/or audio streams processed through a video encoding and/or transcoding service that enables surveillance in security and monitoring scenarios for IoT devices 28, as well as industrial and commercial security.

The channel model used by architecture 500 may be a transient concept where channels may be established when there is at least one publisher and/or subscriber. The publisher and/or subscriber process for the channels occurs in an authenticated context. The channel implementations may be near state-less from the registry point of view and hence the device connectivity may be global out of the box.

In addition, the channel model used by architecture 500 may allow the implementation of the natural device life cycle that separates the planning from the commissioning process. Today, systems may fuse these two distinct phases together into single step by creating the devices in an operational IoT messaging broker registry. Such a model can result in lots of phantom devices that exist in the registry but never are actually commissioned.

Moreover, since channels are globally available, the global IoT connectivity fabric 110 may decide to connect to an available channel with the help of a GCF Node discovery service 26 that knows the nearby GCF Nodes 16 with the available channel. The GCF Node discovery service 26 may be aware of the availability of the GCF nodes 16 and may redirect the channel connectivity requests through appropriate GCF nodes 16.

The channel model, with the help of the GCF Node discovery service 26, enables universally available connectivity deployments by redirecting the connection requests to a nearby available GCF node 16. Once a connection is established, IoT devices 28 start publishing to the channels as dictated by the metadata 32 downloaded through the control channel. The GCF node 16 in turn publishes the messages to the respective subscribers after ensuring that the publishers and the subscribers have the necessary security credentials to do so. The IoT devices 28 may go to the nearest GCF node 16 and the GCF node 16 knows how to communicate with the corresponding application 10.

IoT devices 28 that move within the same geography or even across continents may use the same channel without losing logical connectivity. For example, fleet of trucks, trains, equipment that gets rented, and/o shipping containers may use the global IoT connectivity fabric 110 to use channels to connect to the applications 10 across space and time.

As such, the channel architecture 500 of the global IoT connectivity fabric 110 may allow the natural composition of devices (e.g., gateways, single devices, clusters of devices that include trucks, and/or trains) to be connected to the messaging layer without being aware of the physics of the composition.

Figure 6:
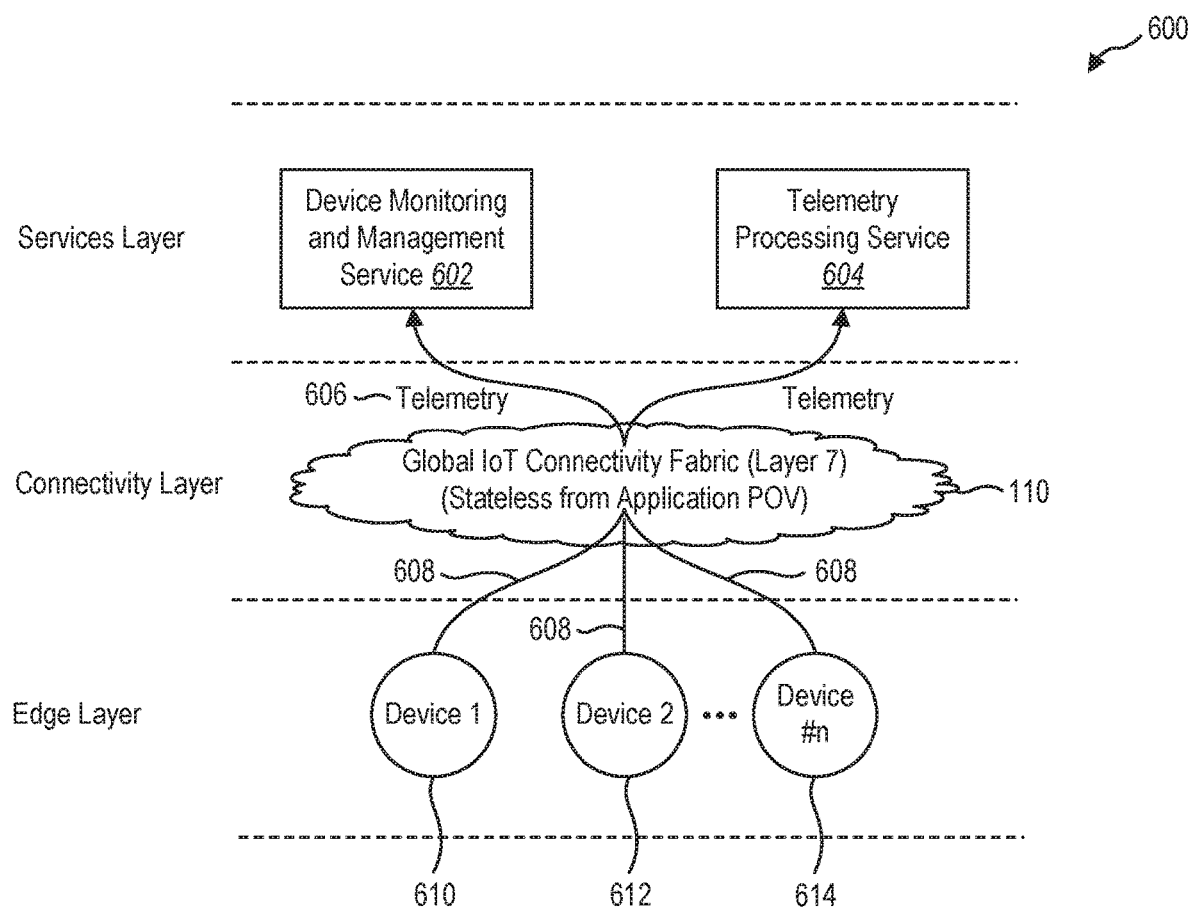
FIG. 6 illustrates an example IoT system using a telemetry channel only model in accordance with an implementation of the present disclosure.

Referring now to FIG. 6, an example IoT system 600 for use with architecture 500 (FIG. 5) may use a telemetry channel only model. IoT system 600 may include one or more sensors only, or read-only, IoT devices 28. Examples of sensors only IoT devices 28 may include, but are not limited to, remote sensors that measure pipeline flow at various segments of a gas pipeline, monitoring traffic flow in smart cities, and/or operational intelligence (OI) systems in process industries (e.g., oil refineries or water treatment centers) may only gather sensor telemetry data for systems monitoring.

IoT devices 28 may use sensors to acquire telemetry data 606, such as, but not limited to, temperature readings, measurements of pipeline flows, measurements of traffic flows, and/or pressure readings. IoT devices 28 may subscribe to the same publisher channel 504 to transmit the telemetry data 606 to one or more device management and/or monitoring services 602 and/or one or more telemetry processing services 604.

IoT devices 28 may be in the same geographic location and/or may be distributed across several different geographical locations. The global IoT connectivity fabric 110 may be used to facilitate the communications between the IoT devices 28 and the management and/or monitoring services 602 and/or the telemetry processing services 604 using publisher channel 504 to transmit the telemetry data 606. For example, the global IoT connectivity fabric 110 may expose publisher channel 504 and may unwrap the underlying socket for sending and receiving byte streams using publisher channel 504.

Figure 7:
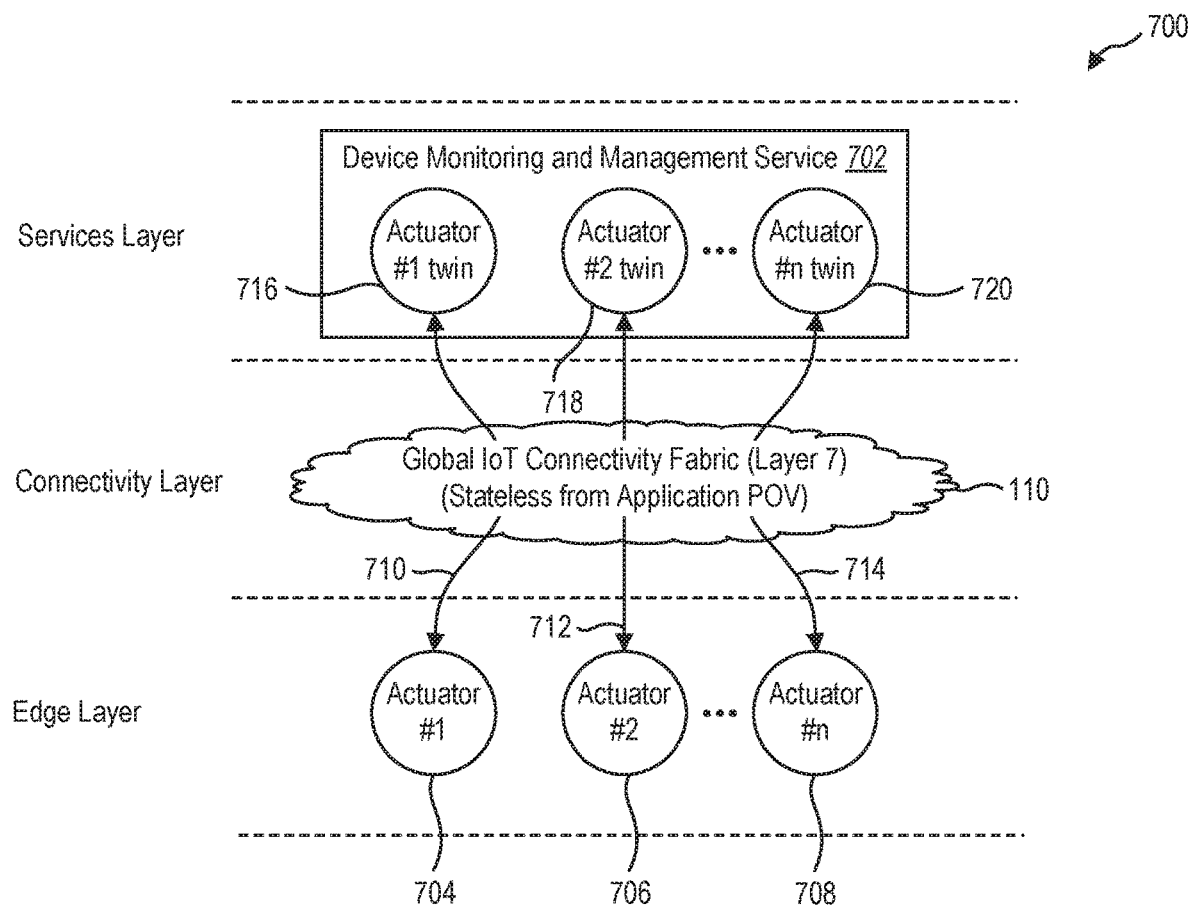
FIG. 7 illustrates an example IoT system using a subscriber channel model in accordance with an implementation of the present disclosure.

Referring now to FIG. 7, an example IoT system 700 for use with architecture 500 (FIG. 5) may use a subscriber channel model. IoT system 700 may include one or more actuator IoT devices 704, 706, 708. Actuator only IoT devices 704, 706, 708 may not need a publisher channel 504 and may only subscribe to channel publishing commands. IoT system 700 may be a micro command system, where the commands may be sent from a device monitoring and management service 702 to individual actuator IoT devices 704, 706, 708. Each actuator IoT device 704, 706, 708 may subscribe to a different subscriber channel 710, 712, 714 to receive the commands sent from device monitoring and management service 702.

In an implementation, each actuator IoT device 704, 706, 708 may have a corresponding actuator twin 716, 718, 720 in the device monitoring and management service 702. The actuator twins 716, 718, 720 may communicate with the actuator IoT devices 704, 706, 708 using the subscriber channels 710, 712, 714 to send one or more commands from the device monitoring and management service 702. For example, actuator twin 716 may use subscriber channel 710 to send commands to actuator IoT device 704. Actuator twin 718 may use subscriber channel 712 to send commands to actuator IoT device 706, and actuator twin 720 may use subscriber channel 714 to send commands to actuator IoT device 708.

One example use case may include device monitoring and management services 702 changing a temperature of different rooms of a building controlled by different actuator IoT devices 704, 706, 708. For example, device monitoring and management services 702 may use actuator twin 716 to send a command using subscriber channel 710 to increase the temperature of the room controlled by actuator IoT device 704 from 53 degrees Fahrenheit to 73 degrees Fahrenheit. Device monitoring and management services 702 may use actuator twin 718 to send a command using subscriber channel 712 to lower the temperature of the room controlled by actuator IoT device 706 from 75 degrees Fahrenheit to 65 degrees Fahrenheit. In addition, device monitoring and management services 702 may use actuator twin 720 to send a command using subscriber channel 714 to maintain the temperature of the room controlled by actuator IoT device 708 at 72 degrees Fahrenheit.

Actuator IoT devices 704, 706, 708 may be in the same geographic location and/or may be distributed across several different geographical locations. The global IoT connectivity fabric 110 may be used to facilitate the communications between the actuator IoT devices 704, 706, 708 and the management and/or monitoring services 702 using subscriber channels 710, 712, 714. For example, the global IoT connectivity fabric 110 may expose subscriber channels 710, 712, 714 and may unwrap the underlying socket for sending and receiving byte streams using subscriber channels 710, 712, 714.

Figure 8:
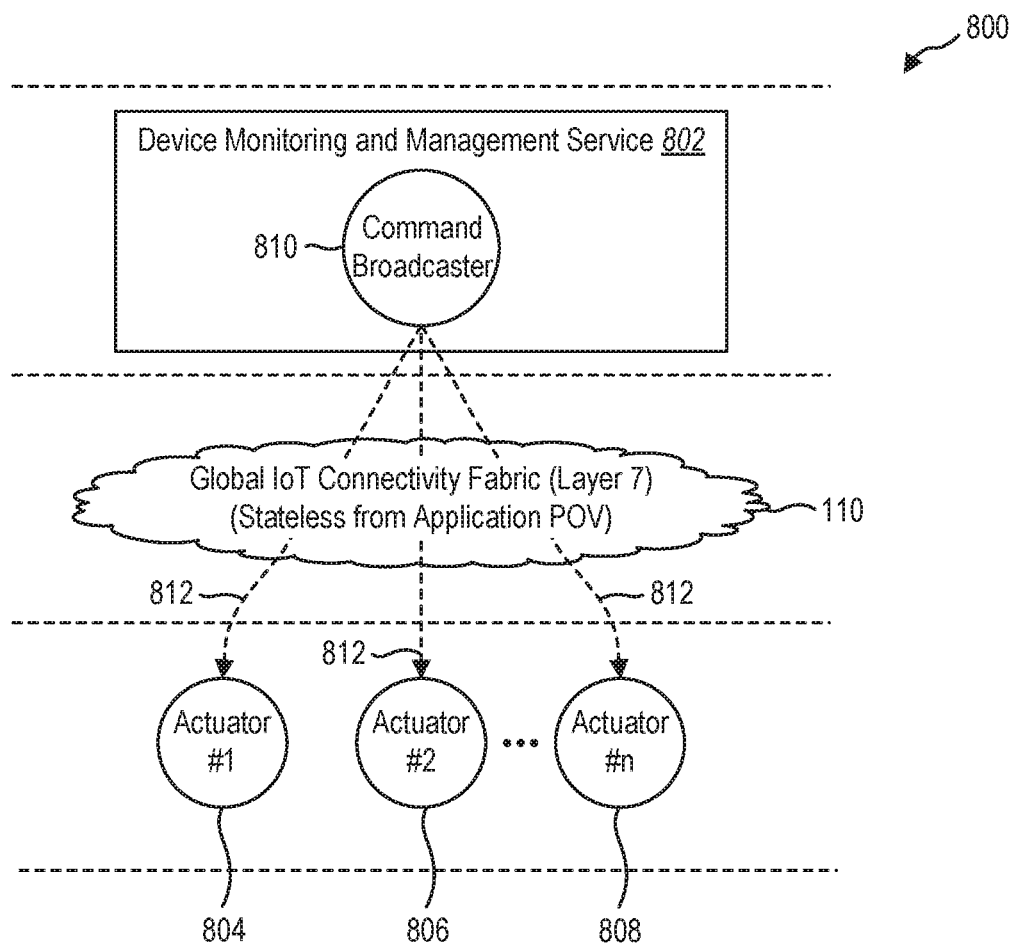
FIG. 8 illustrates an example IoT system using a broadcast channel model in accordance with an implementation of the present disclosure.

Referring now to FIG. 8, an example IoT system 800 for use with architecture 500 (FIG. 5) may use a broadcast subscriber channel model. IoT system 800 may include one or more actuator IoT devices 804, 806, 808. IoT system 800 may be a macro command system, where the commands may be sent from a command broadcaster 810 within a device monitoring and management service 802 to a plurality of devices, such as, all the actuator IoT devices 804, 808, 808.

Each actuator IoT device 804, 806, 808 may subscribe to a broadcast channel 812 to listen to any broadcast messages from device monitoring and management service 802. Broadcast channel 812 may be used for publishing commands to the actuator IoT devices 804, 806, 808.

One example use case may include device monitoring and management services 802 sending a broadcast message to change a temperature of different rooms of a convention center controlled by different actuator IoT devices 804, 806, 808. Command broadcaster 810 may send a broadcast message The broadcast message may be sent using broadcast channel 812 to all the actuator IoT devices 804, 806, 808 to lower the temperature in all of the rooms controlled by the actuator IoT devices 804, 806, 808 to 60 degrees Fahrenheit. As such, instead of instructing each of the IoT devices 804, 806, 808 individually with the temperate change for the convention center, the broadcast message may be sent to all the actuator IoT devices 804, 806, 808 with the temperature change information.

Actuator IoT devices 804, 806, 808 may be in the same geographic location and/or may be distributed across several different geographical locations. The global IoT connectivity fabric 110 may be used to facilitate the communications between the device monitoring and management service 802 and actuator IoT devices 804, 806, 808 using broadcast channel 812. For example, the global IoT connectivity fabric 110 may expose broadcast channel 812 and may unwrap the underlying socket for sending and receiving byte streams using broadcast channel 812.

Figure 9:
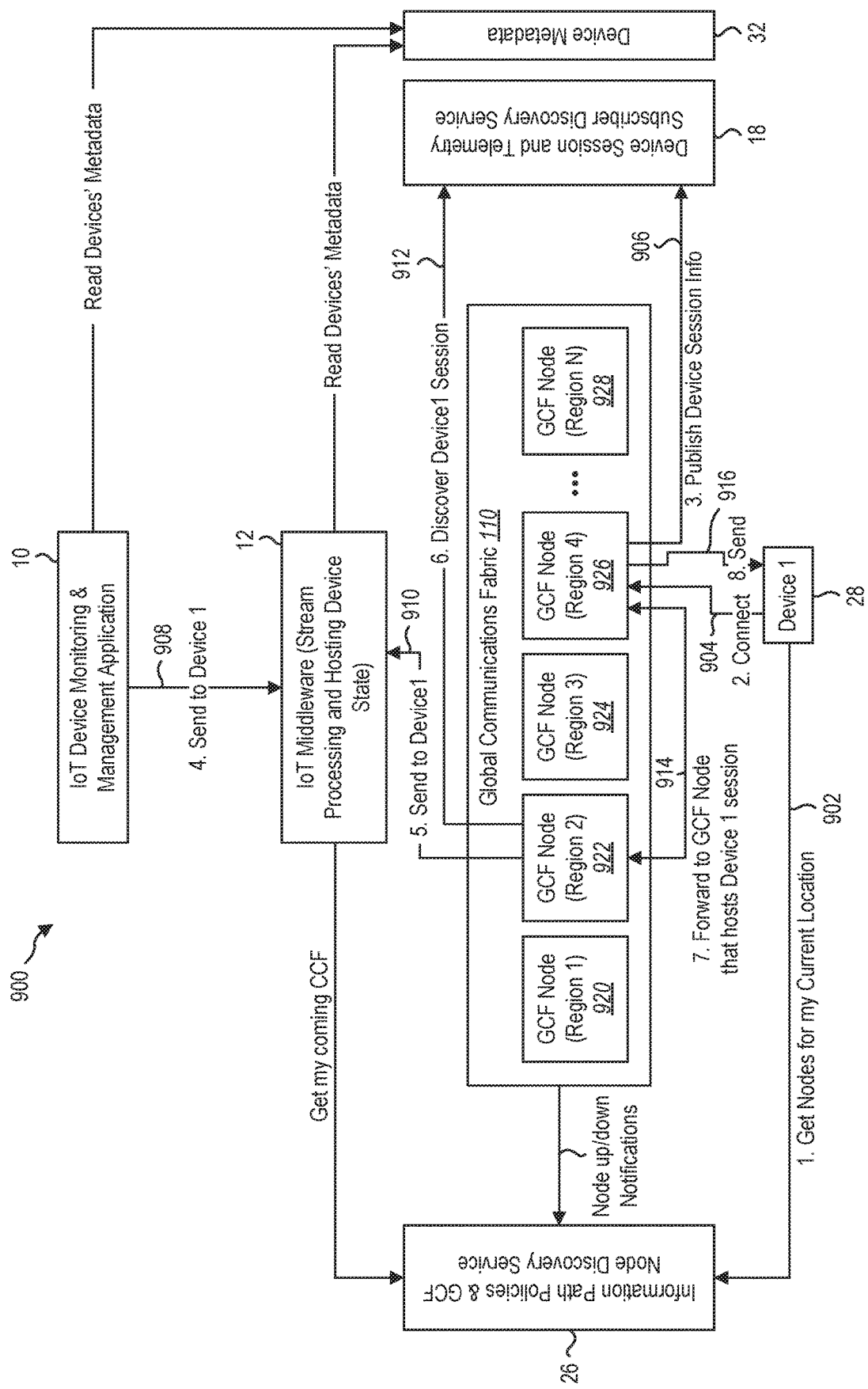
FIG. 9 illustrates an example method flow for sending a command from an application to an IoT device in accordance with an implementation of the present disclosure.

Referring now to FIG. 9, a method 900 for sending a command from a device monitoring and management application 10 to an IoT device 28 using the global IoT connectivity fabric 110 may be implemented by IoT system 100. Command and control may be enabled by the global IoT connectivity fabric 110 to allow a remote application 10 to control an IoT device 28 with the state change command sent through the previously established communications channels. The global IoT connectivity fabric 110 may use a plurality of GCF nodes 920, 922, 924, 926, 928 in different geographic regions to facilitate the command and control messaging. The actions of method 900 may be discussed below with reference to IoT system 100 and the architectures of FIGS. 1-5.

At 902, method 900 may include receiving GCF Nodes nearby a current location of an IoT device. IoT device 28 may send a request to GCF node discovery service 26 for a list of one or more GCF nodes 924, 926 nearby a current location of the IoT device 28. The request may include the current location of the IoT device 28. GCF node discovery service 26 may provide the one or more GCF nodes 924, 926 to IoT device 28 in response to IoT device 28 explicitly calling GCF node discovery service 26 to find a nearby connectivity node. GCF node discovery service 26 may also provide the one or more GCF nodes 924, 926 to IoT device 28 through DNS proximity. As such, as a location of the IoT device 28 changes, the one or more GCF nodes 924, 926 nearby IoT device 28 may change.

At 904, method 900 may include connecting to a GCF node. The IoT device 28 may select GCF node 926 to connect to based on the proximity in location of the GCF node 926 relative to the IoT device 28. For example, the IoT device 28 may select GCF node 926 because GCF node 926 is located nearest or closest to the IoT device 28. For example, both the IoT device 28 and GCF node 926 may be in Region 4, e.g., Europe. In addition, if IoT device 28 received a plurality of GCF nodes 924, 926 located within a radius of the IoT device 28, the IoT device 28 may also use a quality of service criteria of the GCF nodes 924, 926 when selecting which connectivity node for connecting with.

At 906, method 900 may include publishing device session information. For example, GCF node 926 may publish the device session information 20 (FIG. 1) for IoT device 28 to a device session manager 18. The device session information 20 may include, for example, a connectivity state of the IoT device 28 and GCF node information 22 (FIG. 1). The GCF node information 22 may identify the GCF node 926 currently connected to the IoT device 28. The device session information 20 may be updated as a connectivity status of the IoT device 28 changes (e.g., disconnects or connects) and/or the IoT device 28 moves locations and connects with a different GCF node 920, 922, 924, 928. As such, the device session information 20 reflects a current state of overall connectivity of the IoT device 28.

In addition, GCF node 926 may publish channel subscription information 24 (FIG. 1) received from the device metadata 32. The channel subscription information 24 may identify which channels IoT device 28 declared for sending and/or receiving information. For example, IoT device 28 may specify a publisher channel to send data, such as telemetry data. IoT device 28 may also specify one or more channels for receiving commands or other control messages from applications 10 and/or services. In addition, IoT device 28 may specify one or more channels for receiving broadcast messages from applications 10 and/or services.

At 908, method 900 may include sending a command to an IoT device. A device monitoring and management application 10 may want to send a command and/or a control message to IoT device 28. The device monitoring and management application 10 may be located in a different region than the IoT device 28. For example, the device monitoring and management application 10 may be located in region 2 (e.g., the United States) and the IoT device 28 may be located in region 4 (e.g., Europe).

The device monitoring and management application 10 may access device metadata 32 for IoT device 28 and the channel subscription information 24. The device monitoring and management application 10 may use the channel subscription information 24 to identify which channel to use when sending the command and/or control message to IoT device 28. For example, the channel subscription information 24 may include an in-memory distributed hash table with the channel ID, subscriber ID, and/or the GCF node ID.

Application 10 may connect to IoT middleware 12. For example, application 10 may connect to IoT middleware 12 located in the same region (e.g., Region 2, the United States) as the application 10. Application 10 may instruct the IoT middleware 12 to send the command to IoT device 28 using the declared channel in the channel subscription information 24.

At 910, method 900 may include sending the command to a GCF node. IoT middleware 12 may access the GCF node discovery service 26 to identify one or more GCF nodes 920, 922 nearby a location of the IoT middleware 12. For example, the IoT middleware 12 may connect to GCF node 922 located nearest to a location of the IoT middleware 12 (e.g., Region 2, the United States).

IoT middleware 12 may send the command from application 10 to the GCF node 922 and may instruct the GCF node 922 to send the command to IoT device 28 using the specified channel.

At 912, method 900 may include discovering the device session information of the IoT device. The GCF node 922 may access the device session manager 18 and may determine whether GCF node 922 hosts the device session for IoT device 28. GCF node 922 may use the device session information 20 and the associated GCF node information 22 to determine whether the device session information 20 is associated with GCF node 922. If a match occurs between the GCF node information 22 and GCF node 922, GCF node 922 may determine that the device session for IoT device 28 is hosted by GCF node 922 and may transmit the control command to IoT device 28.

However, if a match does not occur between the GCF node information 22 and GCF node 922, GCF node 922 may use the GCF node information 22 to determine which GCF node is hosting the device session for IoT device 28, in this example, GCF node 926 in Region 4.

At 914, method 900 may include forwarding the command and any IoT device information to the GCF node hosting the device session for the IoT device. The global IoT connectivity fabric 110 may enable communications between the different GCF nodes 920, 922, 924, 926, 928. One example may include using inter geographies and/or region message bus traffic for enabling communications between the different GCF nodes. As such, GCF node 922 may forward the command from the device and monitoring and management application 10 to GCF node 926, the GCF node hosting the device session for IoT device 28. In addition, GCF node 922 may forward the channel information for IoT device 28.

At 916, method 900 may include sending the command to the IoT device. GCF node 926 may send the command to IoT device 28 using the channel specified by IoT device 28. The IoT device 28 receives the message and handles it as appropriate to the contents of the message. For example, the command may instruct IoT device 28 to unlock a door controlled by IoT device 28.

As such, method 900 may use the global IoT connectivity fabric 110 to send commands from an application and deliver the commands to a remote IoT device.

Method 900 may also be used to broadcast messages to a plurality of IoT devices 28. Assuming that the broadcast channel is configured at the application level, when the broadcast message is sent to IoT middleware 12, IoT middleware 12 sends the broadcast message to all the GCF nodes 920, 922, 924, 926, 928 that are configured to receive messages from the application. The GCF nodes 920, 922, 924, 926, 928 with the help of the device session information 20, may locate the IoT devices 28 that subscribed to the broadcast channel. The GCF nodes 920, 922, 924, 926, 928 forward the messages to the IoT devices 28 through the cached network connection.

Figure 10:
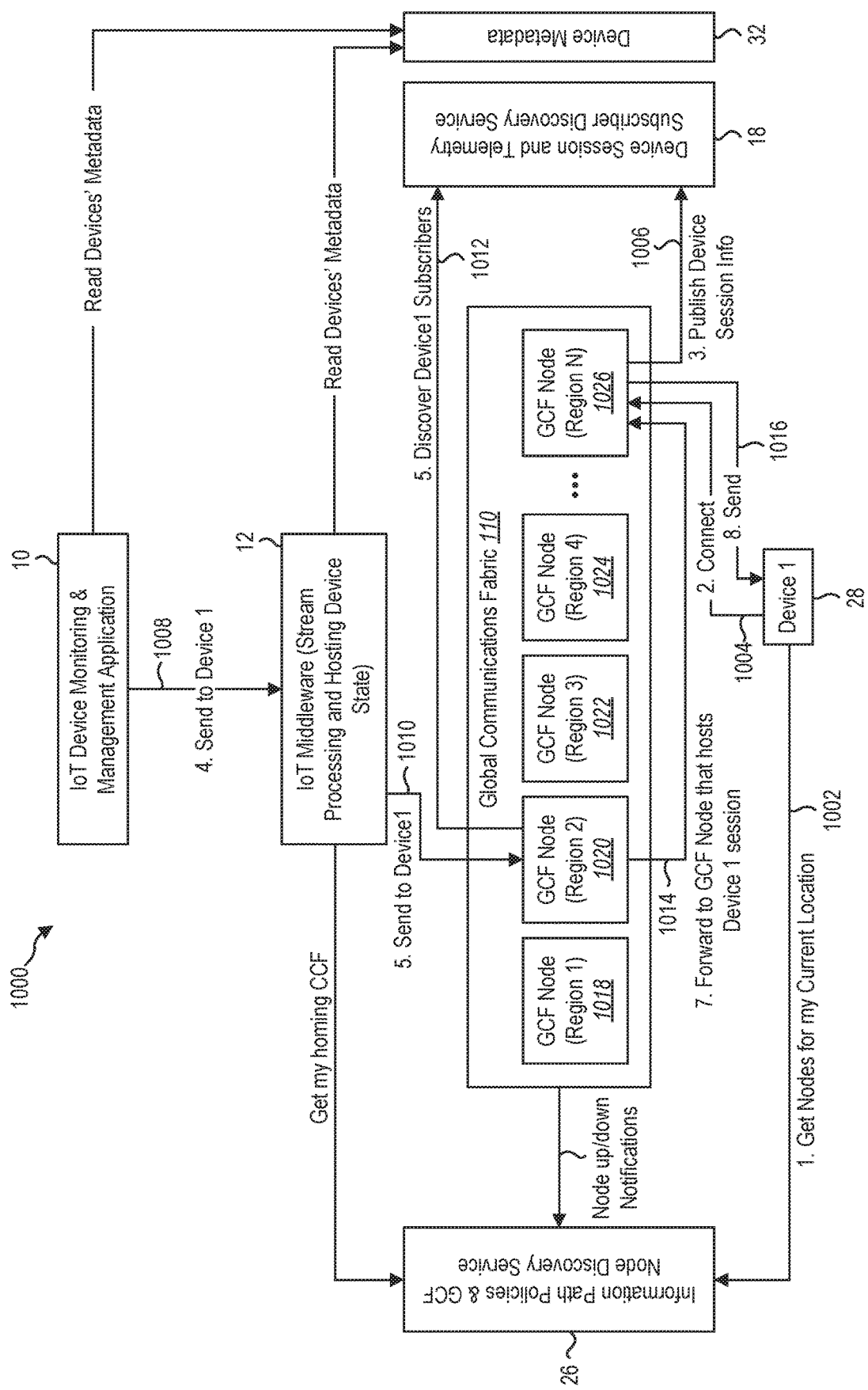
FIG. 10 illustrates an example method flow for sending a command from an application to an IoT device after the IoT device moves in accordance with an implementation of the present disclosure.

Referring now to FIG. 10, a method 1000 for sending a command from a device monitoring and management application 10 to an IoT device 28 using the global IoT connectivity fabric 110 may be implemented by IoT system 100. For example, device IoT device 28 may move to a new location relative to the location used in FIG. 9 and method 1000 may be used to send a command to IoT device 28 at the new location. The actions of method 1000 may be discussed below with reference to IoT system 100 and the architectures of FIGS. 1-5.

The global IoT connectivity fabric 110 allows a remote application 10 to control an IoT device 28 with a command sent through previously established communications channels. In addition, the global IoT connectivity fabric 110 may use a plurality of GCF nodes 1018, 1020, 1022, 1024, 1026 in different geographic regions to facilitate the command messaging.

At 1002, method 1000 may include receiving GCF Nodes nearby a current location of an IoT device. IoT device 28 may send a request to GCF node discovery service 26 for a list of one or more GCF nodes 1024, 1026 nearby a current location of the IoT device 28. The request may include the current location of the IoT device 28. IoT device 28 may have moved to a new location relative to the location of IoT device 28 in FIG. 9. GCF node discovery service 26 may provide the one or more GCF nodes 1024, 1026 that are nearby the new location of IoT device 28. As such, as a location of the IoT device 28 changes, the one or more GCF nodes 1024, 1026 nearby IoT device 28 may change.

At 1004, method 1000 may include connecting to a GCF node. The IoT device 28 may select GCF node 1026 to connect to based on the proximity in location of the GCF node 1026 relative to the new location of IoT device 28. For example, the IoT device 28 may select GCF node 1026 because GCF node 1026 is located nearest or closest to the IoT device 28. In addition, if IoT device 28 received a plurality of GCF nodes 1024, 1026 located within a radius of the IoT device 28, the IoT device 28 may also use a quality of service criteria of the GCF nodes 1024, 1026 when selecting which connectivity node for connecting with.

At 1006, method 1000 may include publishing device session information. For example, GCF node 1026 may publish the device session information 20 (FIG. 1) for IoT device 28 to a device session manager 18. The device session information 20 may include, for example, a connectivity state of the IoT device 28 and GCF node information 22 (FIG. 1). The GCF node information 22 may identify the GCF node 1026 currently connected to the IoT device 28. The device session information 20 may change as a connectivity status of the IoT device 28 changes. For example, the device session information 20 reflect that IoT device 28 disconnected with GCF node 926 (FIG. 9) and connected with GCF node 1026 in response to IoT device 28 moving to a new location. As such, the device session information 20 reflects a current state of overall connectivity of the IoT device 28.

In addition, GCF node 1026 may publish channel subscription information 24 (FIG. 1) received from the device metadata 32. The channel subscription information 24 may identify which channels IoT device 28 declared for sending and/or receiving information. For example, the channels may be the same channels that IoT device 28 previously declared, such as, the one or more channels specified for receiving commands or other control messages from applications 10 and/or services. As such, the channel subscription information 24 may not change in response to IoT device 28 moving to a new location.

At 1008, method 1000 may include sending a command to an IoT device. A device monitoring and management application 10 may want to send a command and/or a control message to IoT device 28. The device monitoring and management application 10 may be located in a different region than the IoT device 28. For example, the device monitoring and management application 10 may be located in region 2 (e.g., the United States) and the IoT device 28 may be located in region N (e.g., Australia).

The device monitoring and management application 10 may access device metadata 32 for IoT device 28 and the channel subscription information 24. The device monitoring and management application 10 may use the channel subscription information 24 to identify which channel to use when sending the command and/or control message to IoT device 28. The channel subscription information 24 may include an in-memory distributed hash table with the channel ID, subscriber ID, and/or the GCF node ID. For example, application 10 may use the same channel to send the command and/or control message to IoT device 28 as previously used to communicate with IoT device 28.

Application 10 may connect to IoT middleware 12. For example, application 10 may connect to IoT middleware 12 located in the same region (e.g., Region 2, the United States) as the application 10. Application 10 may instruct the IoT middleware 12 to send the command to IoT device 28 using the declared channel in the channel subscription information 24.

At 1010, method 1000 may include sending the command to a GCF node. IoT middleware 12 may access the GCF node discovery service 26 to identify one or more GCF nodes 1020 nearby a location of the IoT middleware 12. For example, the IoT middleware 12 may connect to GCF node 1020 located nearest to a location of the IoT middleware 12 (e.g., Region 2, the United States). IoT middleware 12 may send the command from application 10 to the GCF node 1020 and may instruct the GCF node 1020 to send the command to IoT device 28 using the specified channel.

At 1012, method 1000 may include discovering the device session information of the IoT device. The GCF node 1020 may access the device session manager 18 and may determine whether GCF node 1020 hosts the device session for IoT device 28. GCF node 1020 may use the device session information 20 and the associated GCF node information 22 to determine whether the device session information 20 is associated with GCF node 1020. If a match occurs between the GCF node information 22 and GCF node 1020, GCF node 1020 may determine that the device session for IoT device 28 is hosted by GCF node 1020 and may transmit the control command to IoT device 28.

However, if a match does not occur between the GCF node information 22 and GCF node 1020, GCF node 1020 may use the GCF node information 22 to determine which GCF node is hosting the device session for IoT device 28, in this example, GCF node 1026 in Region N.

At 1014, method 1000 may include forwarding the command and any IoT device information to the GCF node hosting the device session for the IoT device. The global IoT connectivity fabric 110 may enable communications between the different GCF nodes 1018, 1020, 1022, 1024, 1026 using, for example, inter geographies and/or region message bus traffic. As such, GCF node 1020 may forward the command from the device and monitoring and management application 10 to GCF node 1026, the GCF node hosting the device session for IoT device 28, using inter geographies and/or region message bus traffic. In addition, GCF node 1020 may forward the channel information for IoT device 28.

At 1016, method 1000 may include sending the command to the IoT device. GCF node 1026 may send the command to IoT device 28 using the channel specified by IoT device 28. The IoT device 28 receives the message and handles it as appropriate to the contents of the message. For example, the command may instruct IoT device 28 to take a pressure reading.

As such, method 1000 may use the global IoT connectivity fabric 110 to send commands from an application and deliver the commands to a remote IoT device.

Figure 11:
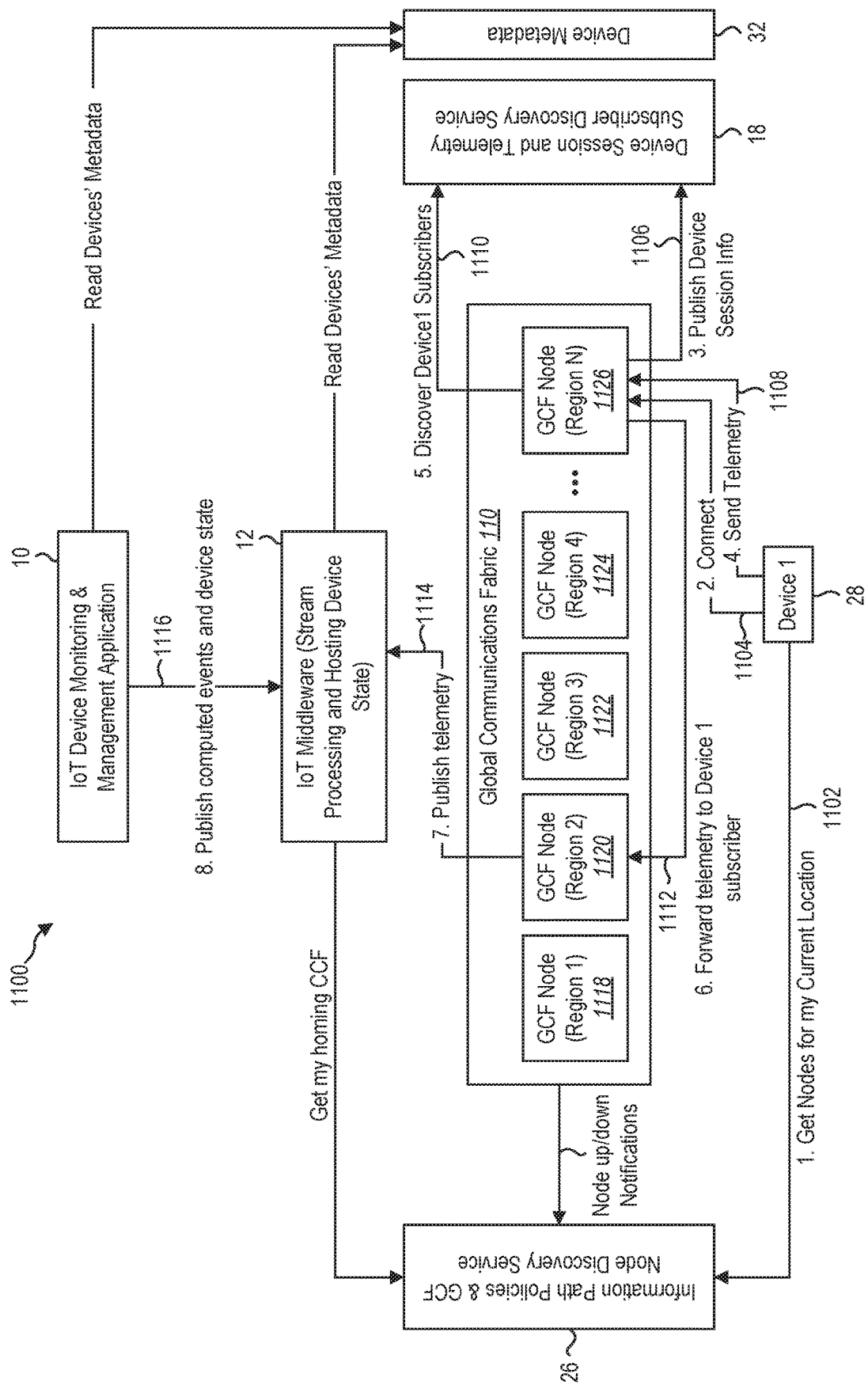
FIG. 11 illustrates an example method flow for sending telemetry data from an IoT device to IoT services in accordance with an implementation of the present disclosure.

Referring now to FIG. 11, a method 1100 for sending telemetry data from an IoT device to a monitoring and management application 10 using the global IoT connectivity fabric 110. The global IoT connectivity fabric 110 may use a plurality of GCF nodes 1118, 1120, 1122, 1124, 1126 in different geographic regions to facilitate the transmission of data from the IoT device 28 to the monitoring and management application 10. The actions of method 1100 may be discussed below with reference to IoT system 100 and the architectures of FIGS. 1-5.

At 1102, method 1100 may include receiving GCF Nodes nearby a current location of the IoT device. IoT device 28 may send a request to GCF node discovery service 26 for one or more GCF nodes 1126 located nearby a current location of the IoT device 28. For example, GCF node discovery service 26 may provide the one or more GCF nodes 1126 to IoT device 28 through domain name server (DNS) proximity. The GCF node discovery service 26 may also provide the one or more GCF nodes 1126 to IoT device 28 in response to IoT device 28 explicitly calling GCF node discovery service 26 to find a nearby connectivity node. As such, as a location of the IoT device 28 changes, the one or more GCF nodes 1126 nearby IoT device 28 may change.

At 1104, method 1100 may include connecting to a GCF node. The IoT device 28 may select GCF node 1126 to connect to based on the proximity in location of the GCF node 1126 relative to a current location of the IoT device 28. For example, the IoT device 28 may select GCF node 1126 because GCF node 1126 is located nearest or closest to the IoT device 28 in Region N., e.g., Australia.

At 1106, method 1100 may include publishing device session information. For example, GCF node 1126 may publish the device session information 20 (FIG. 1) for IoT device 28 to a device session manager 18. The device session information 20 may include, for example, a connectivity state of the IoT device 28 and GCF node information 22 (FIG. 1). The GCF node information 22 may identify the GCF node 1126 currently connected to the IoT device 28. The device sessions information 20 may be updated as a connectivity status of the IoT device 28 changes (e.g., disconnects or connects) and/or the IoT device 28 moves locations and connects with a different GCF node 1118, 1120, 1122, 1124. As such, the device session information 20 reflects a current state of overall connectivity of the IoT device 28.

In addition, GCF node 1126 may publish channel subscription information 24 (FIG. 1) received from the device metadata 32. The channel subscription information 24 may identify which channels IoT device 28 declared for sending and/or receiving information. For example, IoT device 28 may specify a publisher channel to send data (e.g., telemetry data or other information). IoT device 28 may also specify one or more channels for receiving commands or other control messages from applications 10 and/or services. IoT device 28 may also specify one or more channels for receiving broadcast messages from applications 10 and/or services.

At 1108, method 1100 may send the telemetry data to the GCF node. For example, IoT device 28 may use sensors to acquire telemetry data, such as, but not limited to, temperature readings, measurements of pipeline flows, measurements of traffic flows, and/or pressure readings. IoT device 28 may use the connection established with GCF node 1126 to send the telemetry data acquired by the sensor of the IoT device 28 to GCF node 1126.

At 1110, method 1100 may include discovering subscribers of the IoT device. GCF node 1126 may access the channel subscription information 24 to determine one or more applications subscribed to receiving information and/or data transmitted from IoT device 28. The channel subscription information 24 may identify any channels subscribed to by applications. As such, the channel subscription information 24 may provide the channel information for the channels that IoT device 28 is using to publish or send the telemetry data and which applications have subscribed to receive the information sent from IoT device 28. For example, device and monitoring application 10 may have specified to receive information and/or data from IoT device 28.

At 1112, method 1100 may include forwarding the telemetry data to the device subscribers. The GCF node 1126 may forward the telemetry data from IoT device 28 and the channel information to the GCF node 1120 connected to the IoT middleware 12 communicating with device monitoring and management application 10. For example, the device monitoring and management application 10 may be located in Region 2, e.g., the United States, while the IoT device 28 is located is Region N, e.g., Australia. Device monitoring and management application 10 may communicate with IoT middleware 12 located in the same region as the device monitoring and management application 10 (e.g., Region 2, the United States).

At 1114, method 1100 may include publishing the telemetry data to the IoT middleware. IoT middleware 12 may receive the telemetry data from GCF node 1120.

At 1116, method 1100 may include publishing telemetry data to the application. IoT middleware 12 may publish the telemetry data and/or any device state information received from IoT device 28 to the device monitoring and management application 10.

While method 1100 illustrates a single application receiving the telemetry data from IoT device 28, if a plurality of applications subscribed to receive the telemetry data from IoT device 28, method 1100 may be used to transmit the telemetry data to the plurality of applications.

Each of the components described herein may be in communication with each other using any suitable communication technologies. In addition, while the components are shown to be separate, any of the components or subcomponents may be combined into fewer components, such as into a single component, or divided into more components as may serve a particular implementation.

Moreover, the components may include hardware, software, or both. For example, the components may include one or more instructions stored on a computer-readable storage medium and executable by processors of one or more computing devices. The processors may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. When executed by the one or more processors, the computer-executable instructions of one or more computing devices can perform one or more methods described herein. Alternatively, the components may include hardware, such as a special purpose processing device to perform a certain function or group of functions. Additionally, or alternatively, the components may include a combination of computer-executable instructions and hardware.

Instructions and data may be stored in memory. The instructions may be executable by the processor to implement some or all of the functionality disclosed herein. Executing the instructions may involve the use of the data that is stored in the memory. Any of the various examples of modules and components described herein may be implemented, partially or wholly, as instructions stored in memory and executed by the processor. Any of the various examples of data described herein may be among the data that is stored in memory and used during execution of the instructions by the processor. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An internet of things (IoT) system, comprising:
    a middleware layer including IoT middleware in communication with an application that provides services to at least one IoT device, wherein the at least one IoT device includes metadata with a communication channel declared by the at least one IoT device for communicating with the application; and
    a connectivity fabric layer that accesses the metadata and implements communication pathways or routes for communications between the at least one IoT device and the application based on policies that control interactions between the at least one IoT device and the application, the connectivity fabric layer including:
        a plurality of global IoT connectivity fabric nodes that create a global IoT connectivity fabric that enables establishment of the communication channel between the application and the at least one IoT device, wherein the plurality of global IoT connectivity fabric nodes include a memory and a processor that communicates using inter geographies message bus traffic;
        a device session manager that manages channel subscription information for the communication channel from the metadata, wherein the application subscribes to the communication channel; and
        a global IoT connectivity fabric node discovery service that provides the at least one IoT device dynamic discovery of a nearby global IoT connectivity fabric node of the plurality of global IoT connectivity fabric nodes, wherein the at least one IoT device establishes a network connection with the nearby global IoT connectivity fabric node to communicate with the application, wherein the network connection comprises the communication channel and wherein the global IoT connectivity fabric node discovery service provides the nearby global IoT connectivity fabric node using domain name server (DNS) proximity.

2. The IoT system of claim 1, wherein the metadata further includes declarative communication pathways or routes for communications between the at least one IoT device and the application.

3. The IoT system of claim 1, wherein the application is located in a different geographic region from the at least one IoT device and the application uses a publisher channel to send a command to the at least one IoT device.

4. The IoT system of claim 1, wherein the global IoT connectivity fabric is stateless.

5. The IoT system of claim 1, wherein the polices for the messages pathways include geographical preferences or data sovereignty needs.

6. A method for sending a command from an application to at least one internet of things (IoT) device, the method executed by an IoT system including a global IoT connectivity fabric with a plurality of global IoT connectivity fabric nodes that implements communication pathways or routes for communications between the at least one IoT device and the application based on policies that control interactions between the at least one IoT device and the application, wherein the plurality of global IoT connectivity fabric nodes include a memory and a processor that communicates using inter geographies message bus traffic; a device session manager that manages channel subscription information for the communication pathways from metadata of the at least one IoT device; and a global IoT connectivity fabric node discovery service that provides the at least one IoT device dynamic discovery of a nearby global IoT connectivity fabric node of the plurality of global IoT connectivity fabric nodes, the method comprising:
  connecting the at least one IoT device to a nearby global IoT connectivity fabric node of the plurality of global IoT connectivity fabric nodes, wherein the at least one IoT device declares a communication channel for receiving information from the application, wherein the IoT device determines the nearby global IoT connectivity fabric node discovery service using domain name server (DNS) proximity;
  publishing device session information for the at least one IoT device with connectivity information for the at least one IoT device and channel subscription information for the communication channel;
  receiving, at the global IoT connectivity fabric, a command from the application for the IoT device, wherein the application subscribes to the communication channel declared by the at least one IoT device; and
  sending, from the nearby global IoT connectivity fabric node, the command to the IoT device using the communication channel.

7. The method of claim 6, wherein receiving the command from the application for the IoT device, further includes:
  receiving, at a global IoT connectivity fabric node of the plurality of global IoT connectivity fabric nodes, the command and channel subscription information for the communication channel, wherein the global IoT connectivity fabric is located nearby IoT middleware in communication with the application; and
  identifying the nearby global IoT connectivity fabric node connected to the IoT device.

8. The method of claim 7, further comprising:
  forwarding the command and the channel subscription information for the communication channel from the global IoT connectivity fabric node to the nearby global IoT connectivity fabric node connected to the at least one IoT device using inter geographies message bus traffic.

9. The method of claim 7, wherein identifying the nearby global IoT connectivity fabric node uses the device session information and global IoT connectivity fabric node information to determine that the nearby global IoT connectivity fabric node is hosting the IoT device.

10. The method of claim 6, wherein the at least one IoT device determines the nearby global IoT connectivity fabric node by receiving information from a global IoT connectivity fabric node discovery service in response to a request sent to the global IoT connectivity fabric node discovery service with a current location of the at least one IoT device.

11. The method of claim 6, wherein the application and the at least one IoT device are located in different geographical regions.

12. The method of claim 6, further comprising:
  a plurality of IoT devices connected to the plurality of global IoT connectivity fabric nodes;
  receiving, at the global IoT connectivity fabric, the command from the application for the plurality of IoT devices, wherein the command is a broadcast message and the plurality of IoT devices subscribe to the communication channel used by the application to publish commands; and
  sending, from the plurality of global IoT connectivity fabric nodes, the command to the plurality of IoT devices using the communication channel.

13. A method for sending telemetry data from an internet of things (IoT) device to an application, the method executed by an IoT system including a global IoT connectivity fabric with a plurality of global IoT connectivity fabric nodes that implements communication pathways or routes for communications between the at least one IoT device and the application based on policies that control interactions between the at least one IoT device and the application, wherein the plurality of global IoT connectivity fabric nodes include a memory and a processor that communicates using inter geographies message bus traffic; a device session manager that manages channel subscription information for the communication pathways from metadata of the at least one IoT device; and a global IoT connectivity fabric node discovery service that provides the at least one IoT device dynamic discovery of a nearby global IoT connectivity fabric node of the plurality of global IoT connectivity fabric nodes, the method comprising:
  connecting the IoT device to a nearby global IoT connectivity fabric node of the plurality of global IoT connectivity fabric nodes, wherein the IoT device declares a communication channel for publishing information from the IoT device, wherein the IoT device determines the nearby global IoT connectivity fabric node discovery service using domain name server (DNS) proximity;
  publishing device session information with connectivity information for the IoT device and channel subscription information for the communication channel;
  receiving, at the nearby global IoT connectivity fabric node, the telemetry data from the IoT device, wherein the application subscribes to the communication channel declared by the IoT device; and
  sending the telemetry data to the application using the communication channel, wherein the global IoT connectivity fabric establishes the communication channel between the IoT device and the application.

14. The method of claim 13, wherein sending the telemetry data to the application using the communication channel further comprises:
  discovering that the application subscribed to the communication channel for the IoT device by accessing the channel subscription information for the IoT device.

15. The method of claim 14, wherein sending the telemetry data to the application using the communication channel further comprises:
- forwarding the telemetry data and the channel subscription information for the communication channel to a global IoT connectivity fabric node of the plurality of global IoT connectivity fabric nodes using inter geographies message bus traffic, wherein the global IoT connectivity fabric node is communicating with IoT middleware communicating with the application; and
- sending, from the global IoT connectivity fabric node, the telemetry data to the IoT middleware.

16. The method of claim 15, wherein the IoT device determines the nearby global IoT connectivity fabric node in response to the nearby global IoT connectivity fabric node meeting a quality of service criteria.

17. The method of claim 13, wherein the application and the IoT device are located in different geographical regions.

* * * * *